United States Patent
Ouchi et al.

(10) Patent No.: US 7,533,959 B2
(45) Date of Patent: May 19, 2009

(54) MEDIUM POSITION DETERMINING DEVICES AND IMAGE RECORDING DEVICES

(75) Inventors: Tetsuya Ouchi, Nagoya (JP); Toshiyuki Yamane, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 456 days.

(21) Appl. No.: 11/277,124

(22) Filed: Mar. 21, 2006

(65) Prior Publication Data

US 2006/0221160 A1 Oct. 5, 2006

(30) Foreign Application Priority Data

Mar. 29, 2005 (JP) ............... 2005-095190

(51) Int. Cl.
*B41J 23/00* (2006.01)
*B41J 2/01* (2006.01)

(52) U.S. Cl. ......................... 347/37; 347/101
(58) Field of Classification Search .................. 347/37, 347/101, 14; 318/268, 610; 400/578, 708, 400/283

See application file for complete search history.

(56) References Cited

U.S. PATENT DOCUMENTS

| | | | | |
|---|---|---|---|---|
| 5,748,206 A | * | 5/1998 | Yamane | 347/37 |
| 6,869,241 B2 | * | 3/2005 | Ouchi et al. | 400/578 |
| 6,945,721 B2 | * | 9/2005 | Sato | 400/708 |
| 7,121,749 B2 | * | 10/2006 | Morikawa et al. | 400/283 |
| 2002/0033851 A1 | | 3/2002 | Waldner et al. | |
| 2003/0128002 A1 | * | 7/2003 | Kokubo et al. | 318/268 |
| 2004/0141782 A1 | | 7/2004 | Kato | |
| 2005/0225279 A1 | * | 10/2005 | Hatada | 318/610 |
| 2006/0008310 A1 | * | 1/2006 | Morikawa et al. | 400/283 |

FOREIGN PATENT DOCUMENTS

JP 2004090316 A 3/2004
JP 2004182361 A 7/2004

OTHER PUBLICATIONS

European Patent Office, Communication in EP Appl'n No. 06251706.5-2304(counterpart to above-captioned U.S. patent appl'n) dated Aug. 6, 2006.

* cited by examiner

*Primary Examiner*—Stephen D Meier
*Assistant Examiner*—Carlos A Martinez, Jr.
(74) *Attorney, Agent, or Firm*—Baker Botts L.L.P.

(57) ABSTRACT

A medium position determining device includes a sensor, and a scanning carriage that is configured to move in a reciprocating manner in a scanning direction, in which the sensor is mounted to the scanning carriage. The device also includes a controller that is configured to move the scanning carriage and to determine a position of the scanning carriage with respect to the medium when the scanning carriage moves; in the scanning direction. Moreover, the controller moves the scanning carriage at a first speed in the scanning direction, and after the controller determines that the scanning carriage is in a first position with respect to the medium, the controller moves the scanning carriage in the scanning direction at a second speed that is greater than the first speed.

20 Claims, 30 Drawing Sheets

CONVEYING DIRECTION

MEDIUM POSITION DETERMINING DEVICES AND IMAGE RECORDING DEVICES

CROSS REFERENCE TO RELATED APPLICATION

The present application claims priority from Japanese Patent Application No. 2005-095190, filed on Mar. 29, 2005, the disclosure of which is incorporated herein by reference in its entirety.

BACKGROUND

1. Field of the Invention

The present invention is related to a medium position determining device in which a scanning carriage is configured to move in a reciprocating manner in a scanning direction, and a controller is configured to move the scanning carriage in the scanning direction at a first speed before the scanning carriage reaches a predetermined position, and at a second speed after the scanning carriage reaches the predetermined position.

2. Description of Related Art

Ink jet printers, such as serial printers, are known in the art. In the known ink jet printer, a recording head which introduces ink into an actuator and ejects the ink under pressure using either; the deflection of the actuator; such as a piezoelectric element, an electric strain element, or the like, or the local boiling of the ink due to a heat generating element in response to an input signal, is mounted on a scanning carriage. The scanning carriage moves in a reciprocating manner in a direction that is orthogonal to the conveying direction of a recording paper, and the scanning carriage performs scamming each time the recording paper is conveyed at a predetermined linefeed width. The recording head ejects the ink based on the input signal, thus recording an image on the recording paper.

In such a known ink jet printer, to accurately align the position of the image with respect to the recording paper, left and right edge positions of the recording paper are detected. Specifically, when the image recording is performed to peripheries of left and right edges of the recording paper, that is, when marginless printing is performed, there is a need to accurately detect left and right edge positions of the recording paper.

The detection of edges of the recording paper is performed, for example, by mounting an optical sensor which includes a light, emitting portion which irradiates light to a recording medium, and a light receiving portion which receives a reflection light from the recording medium on a scanning carriage, by performing scanning while irradiating the light to a recording paper, and by detecting the presence of the recording paper in response to an amount of the reflection light.

Referring to FIG. 30, in the known ink jet printer, the detection of the edge of the recording paper is performed, before the image recording performed by the recording head, by activating the optical sensor 90 and by moving the scanning carriage 91 in the width direction of the recording paper P in the vicinity of a front edge of the recording paper P. An output signal of the optical sensor 90 is stored in a storing unit, such as a memory, by correlating the output signal with an encoder amount which indicates a position of the scanning carriage 91, and left and right edge positions of the recording paper P are detected based on the encoder amount of the scanning carriage 91 by analyzing the output signal.

Further, when the recording paper P is arranged obliquely, it is preferable to perform the edge detection of the recording paper P is performed, such that the edge detection of the recording paper P is performed not only in the vicinity of the front end of the recording paper P, but also for every predetermined conveying amount, as indicated by a chained line in FIG. 30. Then the image recording is performed based on obtained left and right edge positions. However, while accurate image recording may be realized by this edge detecting method, because edge detection is performed several times, the image recording speed is reduced.

SUMMARY OF THE INVENTION

Therefore, a need has arisen for positioning determining devices and image recording methods that overcome these and other shortcomings of the related art. A technical advantage of the present invention is that image recording speed may be increased by moving the scanning carriage at a first speed before the scanning carriage reaches a first position, e.g., an edge of the medium, and moving the scanning carriage at a second speed which is greater than the first speed after the scanning carriage reaches the first position.

According to an embodiment of the present invention, a medium position determining device comprises a sensor, and a scanning carriage that is configured to move in a reciprocating manner in a scanning direction. The sensor is mounted to the scanning carriage. The device also comprises a controller that is configured to move the scanning carriage and to determine a position of the scanning carriage with respect to the medium when the scanning carriage moves in the scanning direction. Moreover, the controller moves the scanning carriage at a first speed in the scanning direction, and after the controller determines that the scanning carriage is in a first position with respect to the medium, the controller; moves the scanning carriage in the scanning direction at a second speed that is greater than the first speed.

According to another embodiment of the present invention, an image recording device comprises a conveying mechanism which conveys a recording medium in a scanning direction, a sensor, and a scanning carriage that is configured to move in a reciprocating manner in the scanning direction, in which the sensor is mounted to the scanning carriage. The device also comprises a first controller that is configured to move the scanning carriage and to determine a position of the scanning carriage with respect to the recording medium when the scanning carriage moves in the scanning direction, and a storing unit that is configured to store edge information which indicates an edge position of the recording medium. Moreover, the device comprises a second controller that is configured to control an image recording operation of the recording head based on the edge information stored in the storing unit. Specifically, the first controller moves the scanning carriage at a first speed in the scanning direction, and after the first controller determines that the scanning carriage is in a first position with respect to the recording medium, the first controller moves the scanning carriage in the scanning direction at a second speed that is greater than the first speed.

According to yet another embodiment of the present invention, a method for recording an image using a medium position determining device, where the device comprises a sensor, a scanning carriage that is configured to move in a reciprocating manner in a scanning carriage, and a controller that is configured to move the scanning carriage and to determine a position of the scanning carriage with respect to the medium, comprising the steps of moving the scanning carriage at a first speed in the scanning direction. The method also comprises the steps of determining that the carriage is in a first position with respect to the medium, and after determining that the carriage is in a first position, moving the scanning carriage in the scanning direction at a second speed that is greater than the first speed.

Other features and advantages of the present invention will be apparent to persons of ordinary skill in the art in view of the following detailed description of the invention and the following drawings.

BRIEF DESCRIPTION OF THE DRAWINGS

For a more complete understanding of the present invention, the needs satisfied thereby, and the features and advantages thereof, reference now is made to the following descriptions taken in connection with the accompanying drawings.

DETAILED DESCRIPTION OF EMBODIMENTS

Figure 1:
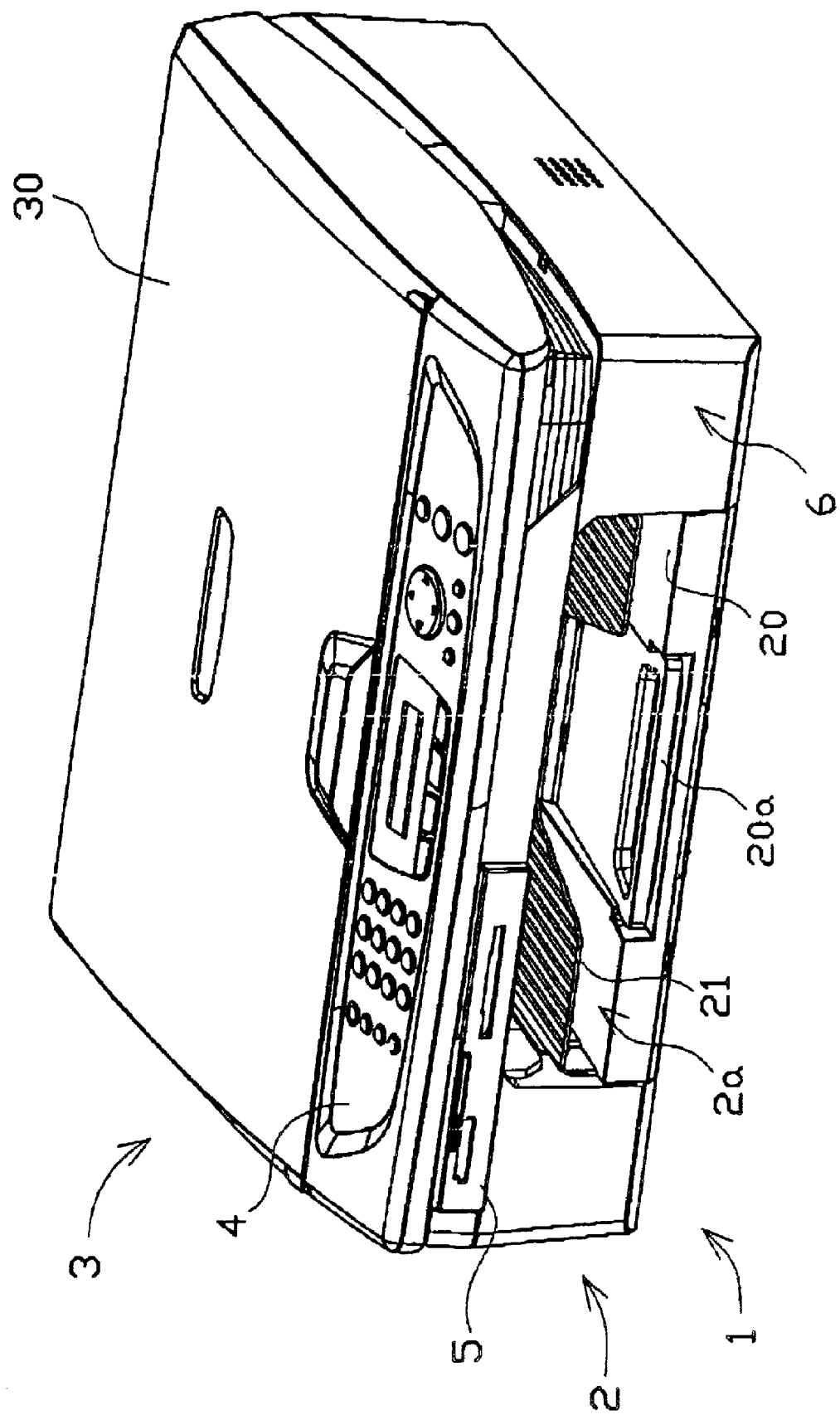
FIG. 1 is a perspective view of a combined machine, according to a first embodiment of the invention.

FIG. 1 shows a combined machine 1 (image recording device) according to an embodiment of the invention. The combined machine 1 may be a multi-function device (MFD) which integrally arranges a printer part 2 at a lower portion and a scanning part 3 at an upper portion, and possesses a printer function, a scanning function, a copying function, and/or a facsimile function, or any combination thereof When the image recording device is carried out as a multi-function device, the image recording device may be a miniaturized image recording device or a large-sized image recording device which includes, a plurality of paper feeding cassettes and an auto document feeder (ADF). Further, the combined machine 1 may be connected to an external information device (not shown), such as a computer, and records an image or a document on a recording paper based on printing data which contains image data and document data transmitted from the computer. The combined machine 1 may be configured to be connected to external equipment, such as a digital camera, and to record image data outputted from the digital camera on recording paper. The combined machine 1 also may load various recording media, such as memory cards, therein, and may record image data recorded in the recording medium on recording paper.

Figure 2:
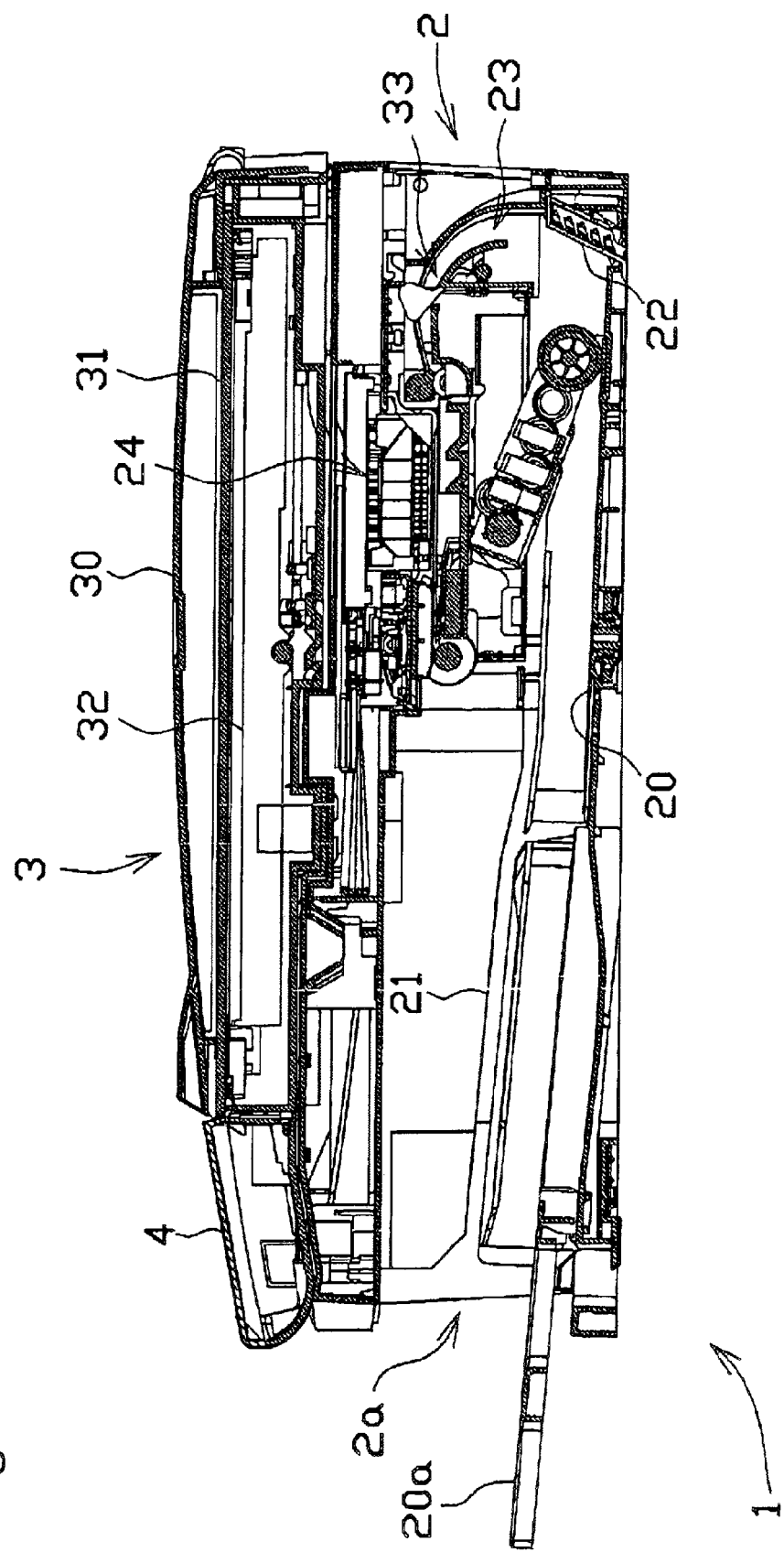
FIG. 2 is a longitudinal, cross-sectional view of the combined machine.

As shown in FIG. 1, the combined machine 1 may have a substantially wide and thin rectangular parallelepiped profile, in which the lateral width and the depth are greater than the height, and a lower portion of the combined machine 1 may comprise a printer part 2. An opening 2a may be formed in a front surface of the printer part 2, and a paper feed tray 20 and a paper discharge tray 21 may be provided in the printer part 2 in two upper and lower stages in a state that these trays 20, 21 are partially exposed from the opening 2a. The paper feed tray 20 may accommodate recording papers which are mediums to be stored, and recording papers of various sizes, such as a B5 size, a post card size below an A4 size, or the like may be accommodated in the paper feed tray 20. In the paper feed tray 20, as shown in FIG. 2, a slide tray 20a may be drawn when necessary so as to widen a tray surface. The recording papers accommodated in the paper feed tray 20 may be fed inside the printer part 2, desired images may be recorded on the recording papers, and the recording papers may be discharged to a paper discharge tray 21.

An upper portion of the combined machine 1 may comprise a scanning part 3, and the scanning part 3 may comprise a flat bed scanner. As shown in FIGS. 1 and 2, below an original cover 30 which is formed as a top plate of the combined machine 1 in a state that the original cover 30 may be opened or closed, a platen glass 31 and an image sensor 32 may be arranged. The platen glass 31 is provided for mounting an original medium from which image is read thereon. Below the platen glass 31, an image sensor 32 which sets the depth direction of the combined machine 1 as the main scanning direction may be provided, such that the image senor 32 may perform the scanning in the width direction of the combined machine 1.

On an upper portion of a front surface of the combined machine 1, an operation panel 4 for operating the printer part 2 and the scanning part 3 may be mounted. The operation panel 4 may comprise various operating buttons and a liquid crystal display part. The combined machine 1 operates in response to operation instructions from the operation panel 4. Further, when the combined machine 1 is connected to a computer, the combined machine 1 also may operate in response to printing data transmitted to the combined machine 1 from the computer via a printer driver. Further, on a left upper portion of the front surface of the combined machine 1, a slot portion 5 which allows the loading of various small-sized memory cards which comprise recording mediums may be formed. The combined machine 1, using the operation panel 4, performs the inputting operation for reading image data which is recorded in the small-sized memory card loaded in the slot portion 5, displaying information on the read image data on the liquid crystal display part, and recording arbitrary images on the recording paper by the printer part 2.

As shown in FIG. 2, on a depth side of the paper feed tray 20 which is mounted on a bottom side of the combined machine 1, a separation inclined plate 22 may be provided, which separates the recording paper which is stacked on the paper feed tray 20 and guides the recording paper upwardly. Further, a conveying passage 23 advances upwardly from the separation inclined plate 22, and thereafter, is bent toward a front face side, extends to the front face side from a back face side of the combined machine 1, passes an image recording part 24, and leads to the paper discharge tray 21. Accordingly, the recording paper which is accommodated in the paper feed tray 20 is guided to make a U-turn upwardly from below by the conveying passage 23, and reaches the image recording part 24. Then, after image recording is performed on the recording paper by the image recording part 24, the recording paper is discharged to the paper discharge tray 21.

Figure 3:
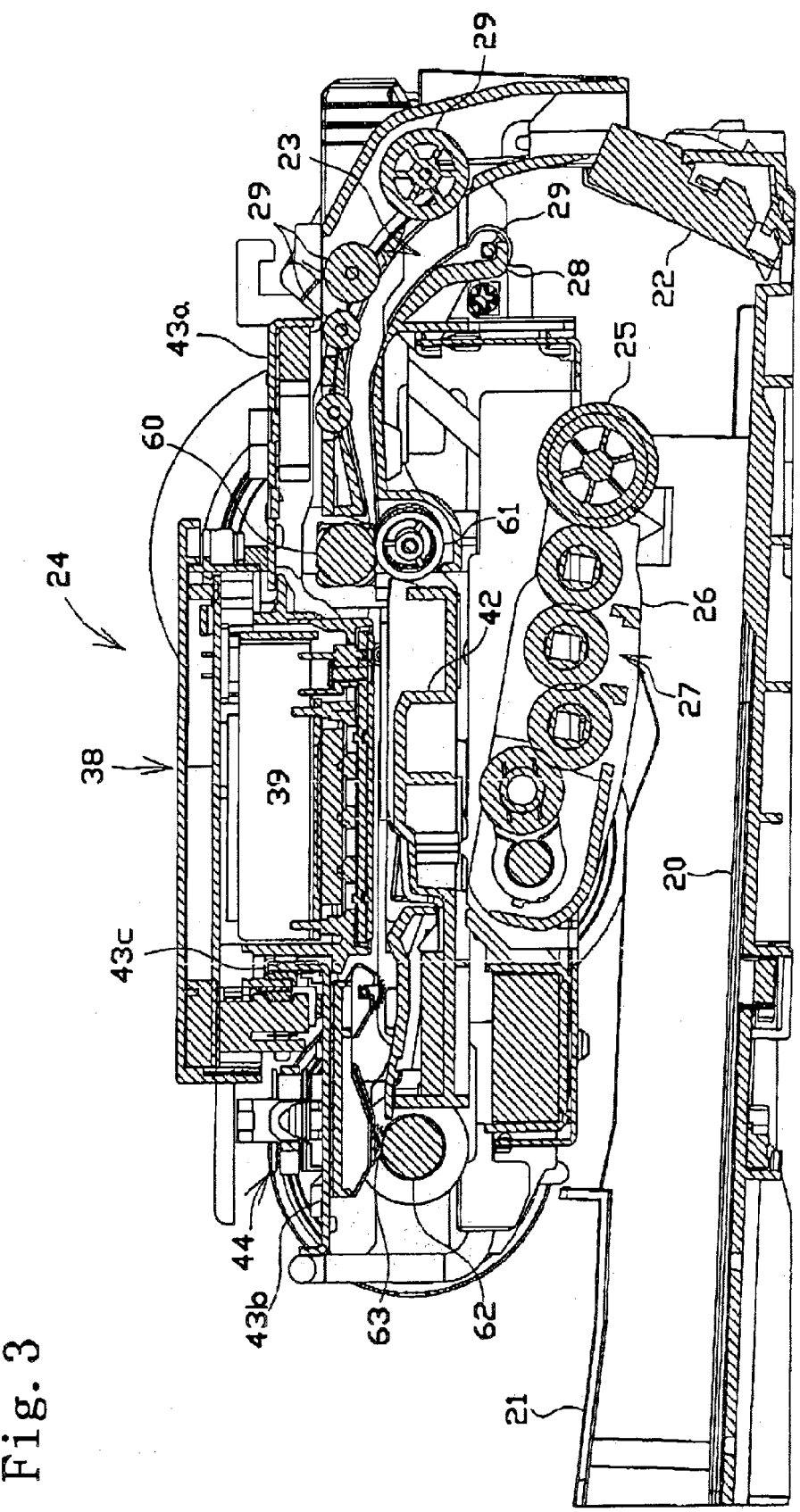
FIG. 3 is an enlarged, cross-sectional view of a printer part.

As shown in FIG. 3, above the paper feed tray 20, a paper feed roller 25 may be provided, which separates the recording papers stacked on the paper feed tray 20 and feeds the separated recording papers to the conveying passage 23 one after another. The paper feed roller 25 may, be pivotally, supported on a front end of a paper feed arm 26 which vertically moves to contact with or to separate from the paper feed tray 20. The driving of a LP (Line Feed) motor 71 (see FIG. 9) may be transmitted to the paper feed roller 25 via a drive power transmission mechanism 27 which may comprise a plurality of gears that engage each other to rotate the paper feed roller 25.

The paper feed arm 26 may be vertically tiltable using a proximal end side thereof as an axis. In a standby state, the paper feed arm 26 may be sprung via a paper feed clutch, a spring, or the like (not shown), and may be tilted downwardly at the time of feeding the recording paper. Along with the downward tilting of the paper feed arm 26, the paper feed roller 25 may be brought into contact with a surface of the recording paper in the paper feed tray 20. In such a state, by rotating the paper feed roller 25, because a frictional force is generated between a roller surface of the paper feed roller 25 and the recording paper, the recording paper is fed to the separation inclined plate 22. A front end of the recording paper contacts the separation inclined plate 22, is guided upwardly, and is fed to the conveying passage 23. Further, in feeding the recording paper using the paper feed roller 25, it is possible that another recording paper right below also is fed due to friction or static electricity, however, by contacting the recording paper with the separation inclined plate 22, it is possible to prevent such a problem.

The conveying passage 23 may, except for portion thereof where the image recording part 24 is arranged, comprise of an outer guide surface and an inner guide surface which face each other with a predetermined gap there between. For example, in the conveying passage 23 on the back face side of the combined machine 1, the outer guide surface may be integrally formed with a frame of the combined machine 1, and the inner guide surface may be formed by fixing a guide member 28 to the inside of the frame. Further, with respect to the conveying passage 23, at a curved portion of the conveying passage 23, particularly, respective conveying rollers 29 may be rotatably provided using the width direction of the conveying passage 23 as the axial direction thereof in a state that roller surfaces of the respective conveying rollers 29 are exposed to the outer guide surface or the inner guide surface. The conveying rollers 29 may smoothly convey the recording paper.

Figure 4:
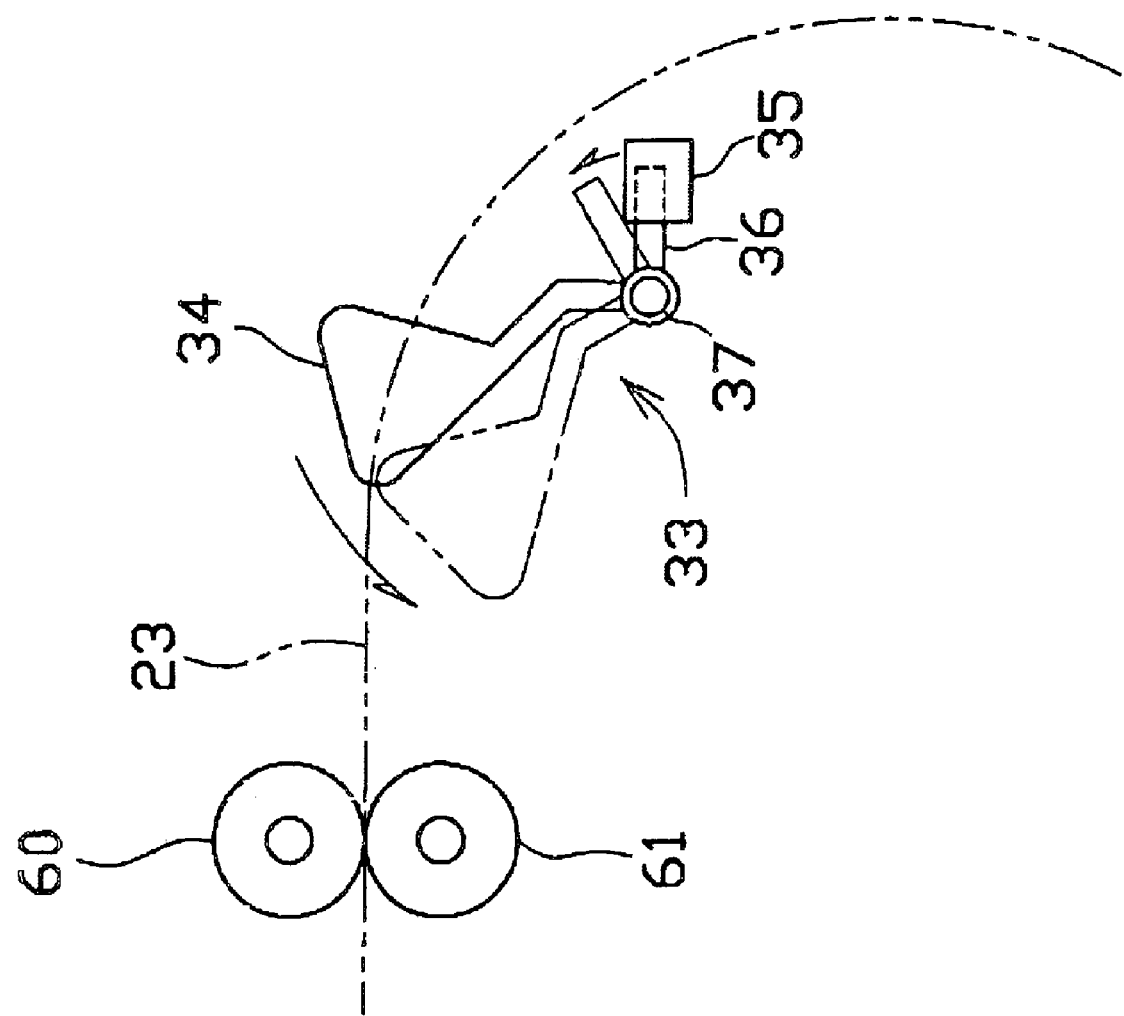
FIG. 4 is an enlarged view showing constitution of a resist sensor.

As shown in FIG. 2, after the conveying passage 23 makes a U-turn upwardly, in the conveying passage 23, a resist sensor 33 may be provided on an upstream side of the image recording part 24. As shown in FIG. 4, the resist sensor 33 may comprise a detector 34 which drops out to the conveying passage 23 and is rotated to retract from the conveying passage 23 when the detector 34 contacts the conveyed recording paper, and a photo interrupter 35 which detects the rotation of the detector 34.

A blocking portion 36 which is detected by the photo interrupter 35 may be integrally formed on the detector 34, and the blocking portion 36 may be formed in a rotatable manner about a shaft 37. The detector 34 may be resiliently biased to a position at which the detector 34 drops out to the conveying passage 23, that is, the detector 34 may be resiliently biased in the clockwise direction in the drawing due to a biasing member, such as a spring (not shown). Accordingly, in a state that an external force is not applied to the detector 34, the detector 34 drops out to the conveying passage 23, and therefore, the blocking portion 36 is positioned between a light emitting portion and a light receiving portion of the photo interrupter 35. Accordingly, the transmission of light of the photo interrupter 35 is blocked and therefore, the resist sensor 33 is deactivated. On the other hand, when the recording paper is conveyed to the conveying passage 23, the recording paper contacts the detector 34, and when the recording paper is further conveyed, the detector 34 rotates to be retracted from the conveying passage 23. The blocking portion 36 may be rotated together with the detector 34, and therefore, the blocking portion 36 may be separated from the position between the light emitting portion and the light receiving portion of the photo interrupter 35. Accordingly, the transmission of light of the photo interrupter 35 no longer is interrupted and therefore, the resist sensor 33 is activated. Based on this activation and deactivation of the resist sensor 33, the passing of the recording paper is detected on the upstream side of the image recording part 24.

As shown in FIG. 3, on a downstream side of the resist sensor 33, the image recording part 24 ray be provided. The image recording part 24 comprises a scanning carriage 38 to which a recording head 39 may be mounted thereon, and the scanning carriage 38 may be configured to move in a reciprocating manner in the main scanning direction. To the recording bead 39, inks of respective colors, such as cyan (C), magenta H, yellow (Y), black (Bk) may be supplied from an ink tank 40 (see FIG. 5) which is arranged separately from, the recording head 39 inside the combined machine 1 via ink supply tubes 41. The recording head 39 ejects respective inks as minute ink droplets. By performing the scanning using the scanning carriage 38, image recording is performed on the recording paper which is conveyed on the platen 42.

Figure 5:
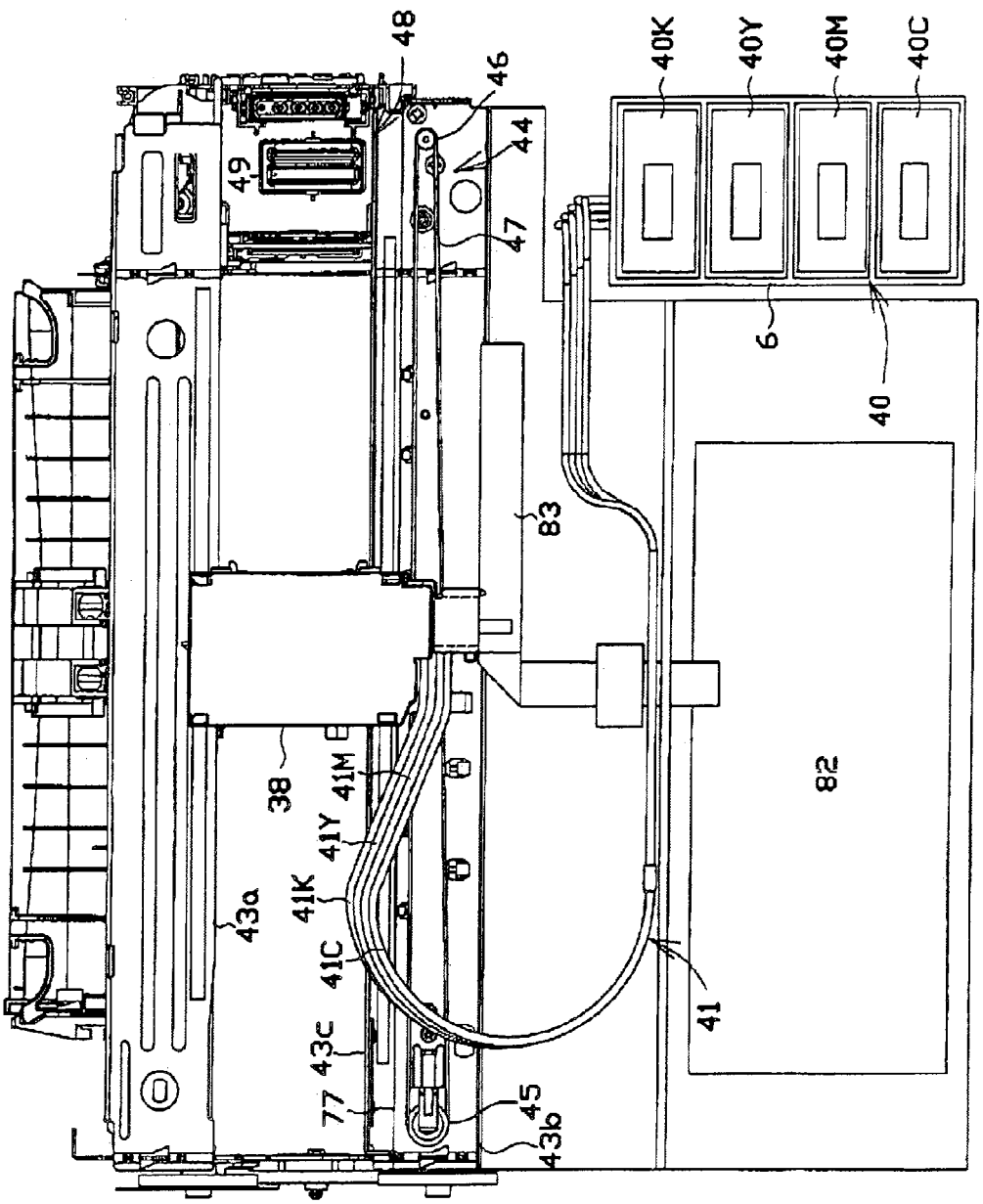
FIG. 5 is a schematic, plan view of a periphery of a scanning carriage.

For example, as shown in FIG. 5, a pair of guide rails 43a, 43b may extend in the width direction of the conveying passage 23 at a predetermined distance in the conveying direction of the recording paper on the upper side of the conveying passage 23. The scanning carriage 38 may be slidably provided in a state that the scanning carriage 38 strides over the guide rails 43a, 43b. The guide rail 43a arranged on an upstream side of the conveying direction of the recording paper may comprise a flat plate in which a length in the width direction of the conveying passage 23 is greater than a scanning width of the scanning carriage 38, and an upstream-side end portion of the scanning carriage 38 may be slidably carried on an upper surface of the guide rail 43a.

The guide rail 43b arranged on a downstream side of the conveying direction of the recording paper may comprise a flat plate in which a length in the width direction of the conveying passage 23 is substantially equal to the length of the guide rail 43a. A peripheral portion 43c of the guide rail 43b which supports a downstream-side end portion of the scanning carriage 38 may be bent upwardly at an approximately right angle. The scanning carriage 38 may be slidably carried on an upper surface of the guide rail 43b, and at the same time, the peripheral portion 43c may be sandwiched by rollers or the like (not shown). Accordingly, the scanning carriage 38 may be slidably carried on the guide rails 43a, 43b, and may be reciprocally moved in the width direction of the conveying passage 23 using the peripheral portion 43c of the guide rail 43b as the reference. Here, on portions of the scanning carriage 38 that contact the upper surface of the guide rails 43a, 43c, slide members which reduce friction may be mounted.

Further, on an upper surface of the guide rail 43b, a belt drive mechanism 44 may be arranged. The belt drive mechanism 44 may be formed by extending an endless ring-like timing belt 47 which comprises teeth on an inner side thereof between a drive pulley 45 and a driven pulley 46 which are respectively provided in the vicinity of both ends in the width-wise direction, of the conveying passage 23. A driving force may be transmitted to a shaft of the drive pulley 45 from a CR motor 73 (see FIG. 9), and the timing belt 47 may circulate based on the rotation of the drive pulley 45. The timing belt 47 alternatively may comprise a belt which has both ends fixed to the scanning carriage 38.

The scanning carriage 38 may be fixed to the tuning belt 47, and may be reciprocally moved over the guide rails 43a, 43b using the peripheral portion 43c as the reference due to the circulating motion of the timing belt 47. The recording head 39 may be mounted on the scanning carriage 38, and therefore, the recording head 39 may be reciprocally moved using the width direction of the conveying passage 23 as the main scanning direction. Further, a strip-like linear encoder 77 may be arranged along the peripheral portion 43c. By detecting the linear encoder 77 with a photo interrupter (not shown), the reciprocating movement of the scanning carriage 38 may be controlled based on the encoder amount.

As shown in FIG. 3, below the conveying passage 23, the platen 42 may be arranged in a state that the platen 42 faces the recording head 39. The platen 42 may be arranged to extend over a center portion of a reciprocally movable range of the scanning carriage 38 in which the recording paper passes. A width of the platen 42 is sufficiently large relative to a maximum, width of the conveyable recording paper, and therefore, both edges of the recording paper are able to pass above the platen 42. Further, a color of an upper surface of the platen 42 color which has reflectance that is different than the reflectance of the color white which is the color of general recording paper. For example, the color of the upper surface of the pattern 42 may be black.

Further, as shown in FIG. 5, in a range in which the recording paper does not pass, that is, outside a range in which the image recording is performed by the recording head 39, maintenance units, such as a purging mechanism 48, and a waste ink tray (not shown) may be arranged. The purging mechanism 48 is provided for sucking and removing bubbles and foreign substances together with ink from nozzles 53 of the recording head 39. The purging mechanism 48 may comprise a cap 49 which covers a nozzle surface of the recording head 39, a pump mechanism (not shown) which is connected with the recording head 39 via the cap 49, and a moving mechanism (not shown) for allowing the cap 49 to separate from or to contact the nozzle surface of the recording head 39. During the removal of bubbles or the like of the recording head 39 by suction, the scanning carriage 38 may be moved to a position at which the recording head 39 is arranged above the cap 49, and in such a state, the cap 49 may be moved upwardly to contact ink ejecting ports 53a (see FIG. 6) formed on a lower surface of the recording head 39 so as to hermetically seal the ink ejecting ports 53a, and ink is sucked from the nozzle 53 of the recording head 39 via a pump which is connected to the cap 49.

A waste ink tray (not shown) for receiving of ink ejected from the recording head 39, which is referred to as flushing, also may be provided within the reciprocally movable range of the scanning carriage 38 and outside of the image recording range. Consequently, it is possible to, perform maintenance, such as the removal of bubbles and mixed ink the recording head 39.

The ink tank 40 may be housed in an ink tank housing portion 6 which is provided in a casing arranged on a front face side and at the left side of the printer part 2. As shown in FIG. 5, the ink tank 40 may be arranged separately from the scanning carriage 38, and ink may be supplied to the scanning carriage 38 via the ink supply tube 41.

The ink tank 40 may comprise a plurality of ink tanks, e.g., ink tanks 40C, 40M, 40Y, 40K which store inks of respective colors, e.g., cyan (C), magenta (M), yellow (Y), black (Bk), and the ink tanks may be respectively loaded to predetermined positions in an ink housing portion 6 formed inside the device casing. The respective ink tanks 40C, 40M, 40Y, 40K may be of a cartridge type which fills ink of each color into a synthetic-resin-made casing, and may be detachably mounted into the ink housing portion 6 from above. In bottom portions of casings of respective ink tanks 40C, 40M, 40Y, 40K openings for supplying the inks of respective colors which are stored respectively in the ink tanks may be formed, and the openings may be sealed by check valves. A joining portion which releases the check valves may be mounted in the ink housing portion 6, and by loading the respective ink tanks 40C, 40M, 40Y, 40K into the ink housing portion 6, the check valves of the openings may be released, thus allowing the supply of inks from the openings.

In this embodiment, inks of four colors are employed. However, the number of ink colors may be any number of ink colors. Moreover, the number of ink tanks may correspond to the number of ink colors.

Inks of respective colors may be supplied to the recording head 39 from the respective ink tanks 40C, 40M, 40Y, 40K which are loaded in the ink housing portion 6 via the ink supply tubes 41. The respective ink supply tubes 41C, 41M, 41Y, 41K may comprise a synthetic-resin-made tube and may possess a resiliency which deflects in response to the scanning performed by the scanning carriage 38. The respective ink supply tubes 41C, 41M, 41Y, 41K may have openings formed on one end side thereof which may be connected to the respective joining portions provided at the respective ink tank housing positions of the ink housing portion 6. For example, the ink supply tube 41C may correspond to ink tank 40C and way serve to supply ink of cyan (C). Similarly, the ink supply tubes, 41M, 41Y, 41K may correspond to the ink tanks 40M, 40Y, 40K, respectively, and may serve to supply ink of magenta (M), yellow (Y), black (Bk), respectively.

The respective ink supply tubes 41C, 41M, 41Y, 41K may be pulled out to the vicinity of the center of the device along the width direction of the device, and may be temporarily fixed to an appropriate member, such as a device frame or the like. Further, portions of the respective ink supply tubes 41C, 41M, 41Y, 41K from fixed portions thereof to the scanning carriage 38 are not fixed to the device frame or the like, and change posture thereof following the reciprocal movement of the scanning carriage 38. That is, along with the movement of the scanning carriage 38 toward one end (left side in the drawing) of the reciprocal moving direction, the respective ink supply tubes 41C, 41M, 41Y, 41K may move in the moving direction of the scanning carriage 38 while being deflected, such that the radius of curvature of a curved portion in a U-shape decreases. On the other band, along with the movement of the scanning carriage 38 to another end (right side in the drawing) in the reciprocal moving direction, the respective ink supply tubes 41C, 41M, 41Y, 41K may move in the moving direction of the scanning carriage 38 while being deflected, such that the radius of curvature of the curved portion increases.

Figure 6:
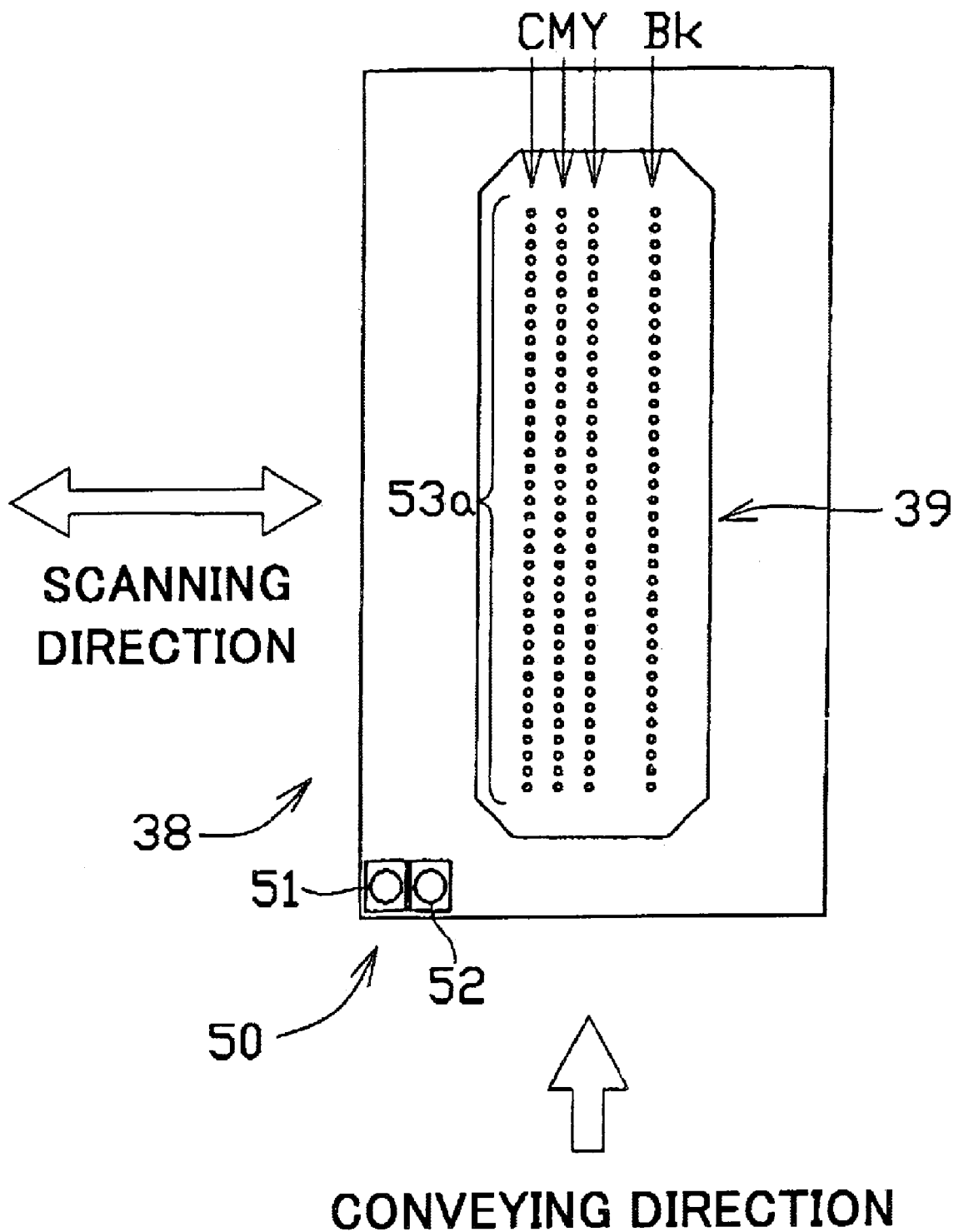
FIG. 6 is a bottom view of the bottom face of the scanning carriage.
Figure 7:
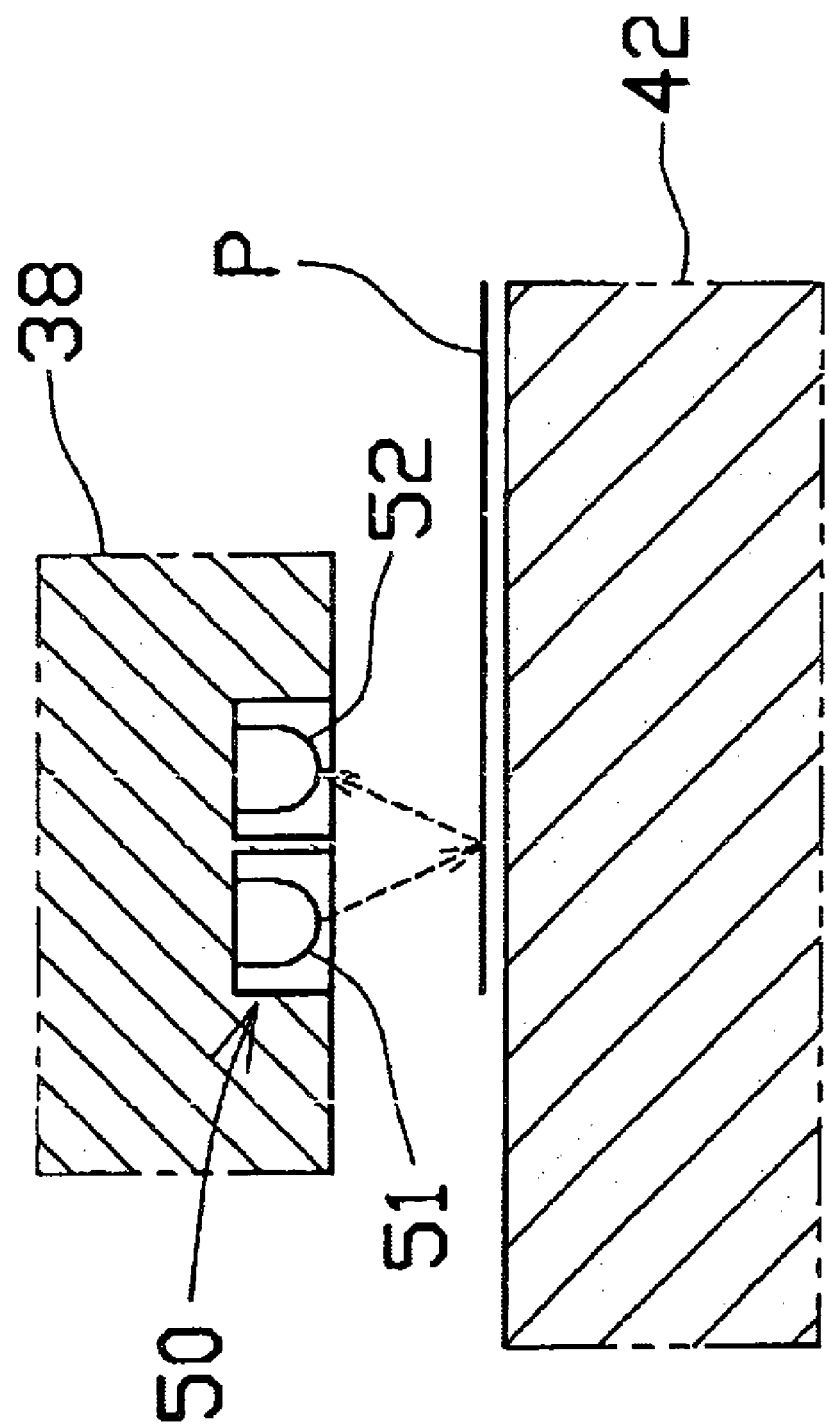
FIG. 7 is a schematic, partial cross-sectional view of a media sensor.

As shown in FIG. 6, a media sensor 50 may be mounted on the scanning carriage 38 together with the recording head 39. The media sensor 50 may comprise an edge detecting unit and a controller 64. The media sensor 50 may comprise, as shown in FIGS. 6 and 7, a light emitting portion 51 which may comprise a light emitting diode and a light receiving portion 52 which may comprise an optical sensor. As shown in FIG. 7, the light emitting portion 51 of the media sensor 50 irradiates light toward the platen 42, and a reflection light of the light is received by the light receiving portion 52.

As described previously, the color of the upper portion of the platen 42 may be a color which has the reflectance that is different than the reflectance of the recording paper P, e.g., black. Accordingly, when the recording paper P is not present, the light receiving portion 52 receives the reflection light from the platen 42 having a low reflectance, and therefore, a detection value (AD value) of the media sensor 50 also is a low value. On the other hand, when the recording paper P is present, the light receiving portion 52 receives the reflection light from the recording paper P having a high reflectance, and therefore, the detection value (AD value) of the media sensor 50 is a high value. Accordingly, it is possible to detect the presence of the recording paper P based on the difference of reflection light quantity which the media sensor 50 receives.

The media sensor 50 may be (as shown in FIG. 6) mounted on the scanning carriage 38 on the upstream side of the conveying direction of the recording head 39, and may be reciprocally moved in the scanning direction via the scanning carriage 38. By mounting the media sensor 50 on the scanning carriage 38 together with the recording head 39, it is unnecessary to provide a scanning carriage for scanning using the media sensor 50 in addition to the scanning carriage 38 for scanning using the recording head 39, and therefore, a size of the combined machine 1 may be reduced. Further, in the scanning carriage 38, because the media sensor 50 is arranged on the upstream side of the conveying direction of the recording head 39, the left and right edge positions of the recording paper may be detected using the media sensor 50 before performing the image recording on the recording paper.

In a lower surface of the recording head 39, as shown in FIG. 6, ink ejecting ports 53a may be arranged in rows in the conveying direction of the recording paper for respective color inks of C, M, Y, Bk. Here, a pitch and the number in the conveying direction of the respective ink ejecting, ports 53a are suitably selected by taking the resolution of the recording image or the like into consideration. Further, the number of rows of the ink ejecting ports 53a may be increased or decreased corresponding to the number of kinds of color inks.

Figure 8:
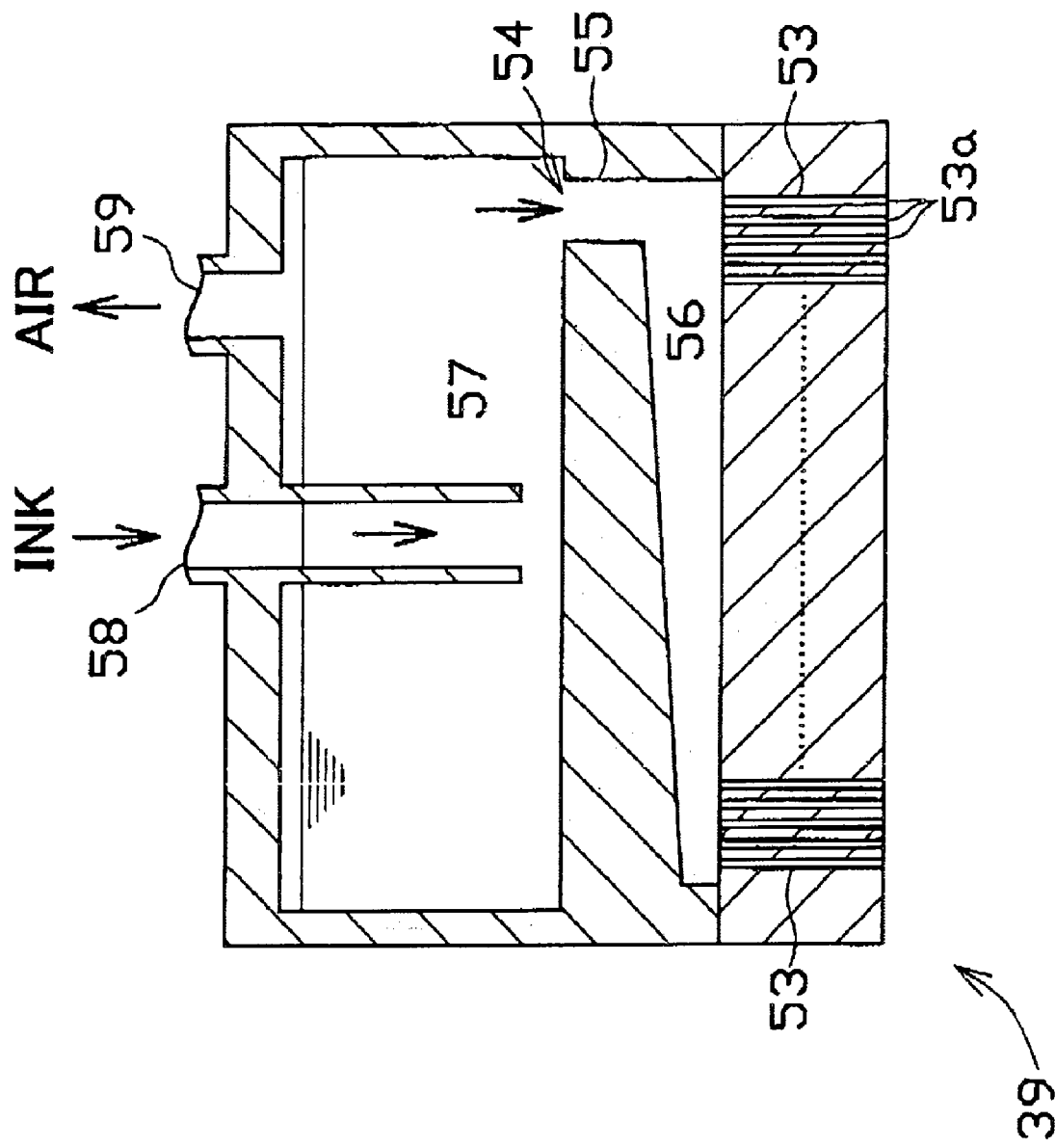
FIG. 8 is a schematic, cross-sectional view of a recording head.

As shown in FIG. 8, lower ends of the nozzles 53 which may be formed in the lower portion of the recording head 39 in rows open on a lower surface of the recording head 39, thus forming the ink ejecting ports 53a. On an upper end side of the nozzle 53, a manifold 54 may be formed in a state that the manifold 54 extends over the plurality of nozzles 53 for respective color inks. The manifold 54 may comprise supply tubes 55 which may be formed on one end side of the nozzles 53 formed in rows and manifold chambers 56 which are formed extending over upper ends of the respective nozzles 53, and the inks supplied from the supply tubes 55 may be distributed to the respective nozzle 53 via the manifold chamber 56.

Faces of the manifold chambers 56 which face the respective nozzles 53 may be inclined downwardly toward a downstream side to which the inks flow, and a cross-sectional area of the manifold chamber 56 may be decreased toward the downstream side. A mechanism which the respective nozzle 53 ejects the ink distributed by the manifold 54 from the ink ejecting port 53a as a droplet may be configured, such that side walls of the nozzle 53 is formed of a piezoelectric material and ink droplets are ejected due to the deformation of the piezoelectric material. Other known mechanisms also may be used as the mechanism for ejecting the ink.

Further, above the manifold 54, a buffer tank 57 may be arranged. The buffer tank 57 may be provided for each color ink of C, M, Y, Bk in the same manner as the nozzles 53 and the manifold 54. To each buffer tank 57, as shown in FIG. 5, ink may be supplied from the ink tank 40 via the ink supply port 58 by way of the ink supply tube 41. In this manner, by temporarily storing the ink inside the buffer tank 57 without directly supplying ink to the nozzle 53 from the ink tank 40, it is possible to collect bubbles generated inside the ink due to the ink supply tube 41 or the like, thus preventing the intrusion of bubbles into the nozzle 53. Further, the bubbles which are collected inside the buffer tank 57 may be removed by suction from a bubble discharge opening 59 using a pump mechanism (not shown).

Further, the buffer tank 57 may be connected to the manifold chamber 56 via the supply tube 55. Accordingly, a flow passage which allows ink of each color supplied from the ink tank 40 to flow into the nozzle 53 through the buffer tank 57 and the manifold 54 may be formed. Inks of respective colors of C, M, Y, Bk which are supplied through the flow passages may be ejected to the recording paper from the ink ejecting ports 53a as ink droplets.

As shown in FIG. 3, on the upstream side of the image recording part 24, a pair of conveying rollers 60 and a press roller 61 which convey the recording paper which is conveyed in the conveying passage 23 in a clamped manner may be provided. On the downstream side of the image recording part 24, a pair of paper discharge rollers 62 and a spur roller 63 which convey the recording paper on which data or the like is already recorded in a clamped state may be provided. A driving force may be transmitted to the conveying rollers 60 and the paper discharge roller 62 from a motor 71, such as a LF motor, so as to intermittently drive these rollers at predetermined linefeed widths. The rotation of the conveying rollers 60 and the rotation of the paper discharge rollers 62 may be synchronized, and by detecting a rotary encoder 76 (see FIG. 9) mounted on the conveying roller 60 using a photo interrupter, rotation of the conveying rollers 60 and the paper discharge rollers 62 may be controlled.

The press roller 61 may be rotatably provided in a state that the press roller 61 is biased to contact the conveying roller 60 and to apply a predetermined amount of force. When the recording paper enters between the conveying roller 60 and the press roller 61, the press roller 61 retracts by a thickness of the recording paper so as to sandwich the recording paper together with the conveying roller 60. Accordingly, the rotational force of the conveying roller 60 is transmitted to the recording paper. The spur roller 63 also may be formed in the same manner with respect to the paper discharge roller 62, and because the spur roller 62 contacts the recorded recording paper, the roller surface is formed into a rough surface in a spur-shape, thereby preventing the image which is recorded on the recording paper from deteriorating.

The recording paper which is sandwiched between the conveying roller 60 and the press roller 61 may be conveyed intermittently on the platen 42 with a predetermined linefeed width. The scanning using the recording head 39 may be performed for every linefeed, and the image recording may be performed from the front end side of the recording paper. Thereafter, the front end side of the recording paper on which the image recording is performed is sandwiched between the paper discharge roller 62 and the spur roller 63. Accordingly, the recording paper may be conveyed intermittently with a predetermined linefeed width in a state that the front end side thereof is sandwiched between the paper discharge roller 62 and the spur roller 63, and the rear end side thereof is sandwiched between the conveying roller 60 and the press roller 61, and in the same manner, the image recording is performed using the recording head 39. Further, when the recording paper is conveyed, the rear end of the recording paper passes through the conveying roller 60 and the press roller 61 and the sandwiching state of the recording paper using these rollers are released. Accordingly, the recording paper is conveyed intermittently with a predetermined linefeed width in a state that the recording paper is sandwiched between the paper discharge roller 62 and the spur roller 63, and in the same manner, the image recording is performed using the recording head 39. After performing the image recording on a predetermined region of the recording paper, the paper discharge rollers 62 are continuously rotatably driven. Accordingly, the recording paper which is sandwiched between the paper discharge roller 62 and the spur roller 61 is discharged on the paper discharge tray 21. The conveying mechanism according to an embodiment of the invention may comprise the conveying roller 60, the press roller 61, the paper discharge roller 62, the spur roller 63, and the paper feed roller 25.

Figure 9:
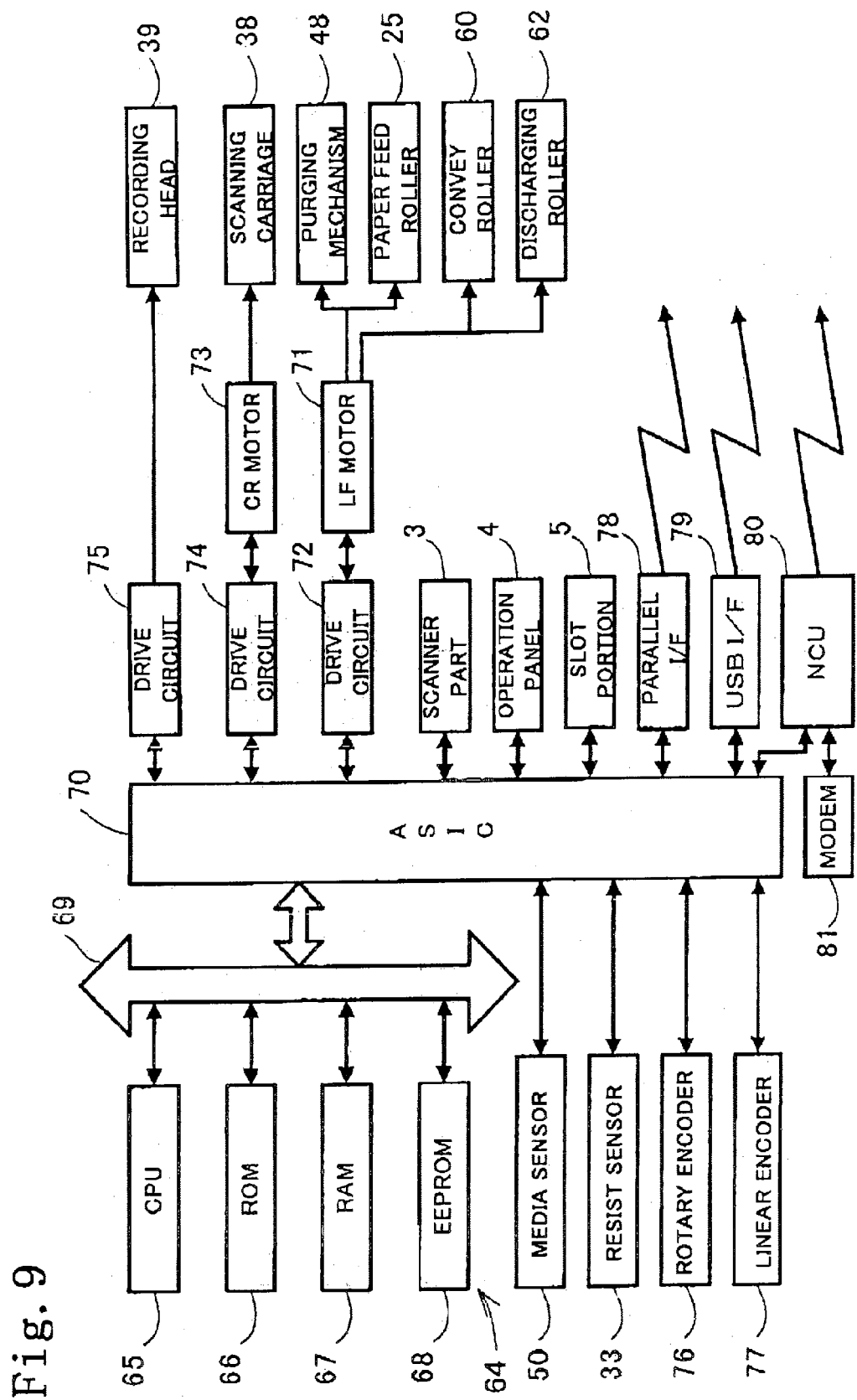
FIG. 9 is a block diagram of a controller of the combined machine.

FIG. 9 shows a controller 64 of the combined machine 1. Although the controller 64 may control the entire operation of the combined machine 1, including not only the scanner portion 2 but also the printer part 3, a detailed explanation of the scanner portion 3 is omitted in this embodiment. The controller 64 may comprise a microcomputer which may comprise a CPU 65, a ROM 66, a RAM 67 (storing unit), and an EEPROM 68, and may be connected to an ASIC (Application Specific Integrated Circuit) 70 via a bus 69.

In the ROM 66, programs for controlling various operations of the combined machine 1 or the like may be stored. The RAM 67 may be used as a storing area which temporally stores various data which are used when the CPU 65 performs the above-described program or working area.

The ASIC 70, in accordance with a command from the CPU 65, generates a mutual excitation signal or the like which is supplied to the LF (convey) motor 71, and applies the signal to a driving circuit 72 of the LF motor 71, and the driving signal may be supplied to the LF motor 71 via the driving circuit 72 so as to perform a rotational control of the LF motor 71.

The driving circuit 72 drives the LF motor 71 which is connected to the paper feed roller 25, the conveying roller 60, the paper discharge roller 62, and the purge mechanism 48, and upon receiving an output signal from the ASIC 70, generates an electric signal for rotating the LF motor 71. Upon receiving the electric signal, the LF motor 71 may be rotated, and a rotational force of the LF motor 71 may be transmitted to the paper feed roller 25, the conveying roller 60, the paper discharge roller 62, and the purge mechanism 48 via a drive mechanism comprising gears, a drive shaft, and the like.

In the same manner, the ASIC 70, in response to a command from the CPU 65, generates a mutual excitation signal or the like which may be supplied to a CR (carriage) motor 73, and applies the signal to a driving circuit 74 of the CR motor 73, and the driving signal may be supplied to the CR motor 73 via the driving circuit 74 so as to perform a rotational control of the CR motor 73.

The driving circuit 74 drives the CR motor 73 which is connected to the scanning carriage 38, and upon receiving an output signal from the ASIC 70, generates an electric signal for rotating the CR motor 73. Upon receiving the electric signal, the CR motor 73 may be rotated, and the rotational force of the CR motor 73 way be transmitted to the scanning carriage 38 via the belt driving mechanism 44 so as to allow the scanning carriage 38 to perform the scanning.

The driving circuit 75 selectively discharges ink on a recording paper from the recording head 39 at a predetermined timing, and upon receiving an output signal which is generated in the ASIC 70 based on the driving control procedure which is outputted from the CPU 65, controls the driving of the recording head 39.

Further, to the ASIC 70, the resist sensor 33 for detecting the recording paper in the conveying passage 26, a rotary encoder 76 for detecting a rotation quantity of the conveying roller 60, a linear encoder 77 for detecting a movement quantity of the scanning carriage 38, and the media sensor 50 for detecting the presence of the recording paper nay be connected. The detection signal of the media sensor 50 may be stored in the RAM 67 via the ASIC 70, and the bus 69 and the CPU 65 determines the edge of the recording paper by analyzing the detection signal based on the program stored in the ROM 66. Accordingly, the edge detecting aspects of the invention may be realized.

Further, to the ASIC 70, the scanner part 3, the manipulation panel 4 for performing the manipulation instruction of the combined machine 1, the slot portion 5 in which a small-sized memory card of various kinds is inserted, a parallel interface 78, a USB interface 79 and the like for performing transmission/reception of data to/from an external device, such as a personal computer via a parallel cable or a USB cable, may be connected. Further, an NCU (Network Control Unit) 80 and a MODEM 81 for performing a facsimile function may be connected.

As shown in FIG. 5, the controller 64 may comprise a main substrate 82, and a recording signal or the like may be transmitted from the main substrate 82 to the recording head 39 via a flat cable 83. The flat cable 83 may be formed in a thin strip which is made of a conductive body which transmits electric signals and is covered with a synthetic resin film, such as a polyester film, so as to insulate the flat cable 83. The flat cable 83 electrically connects the main substrate 82 and a control substrate (not shown) of the recording head 39. Further, the flat cable 83 may be lead out in the reciprocating movement direction from the scanning carriage 38 and may be bent in an approximate U-shape in the vertical direction. This approximate U-shape part is not fixed to other parts and changes the form thereof following the reciprocating movement of the scanning carriage 38.

The image recording operation in the printer part 2 now is described. As shown in a flow chart in FIG. 10, printing data from a computer or a small-sized memory card may be transmitted to the controller 64 (S10). The printing data may comprise, besides the image data for performing the image recording, recording paper information (information on the medium to be detected) which indicates a kind, a size, and/or the like of the recording paper P (medium to be detected). For example, the recording paper information may be produced by a printer driver which is preinstalled in the computer.

Figure 11:
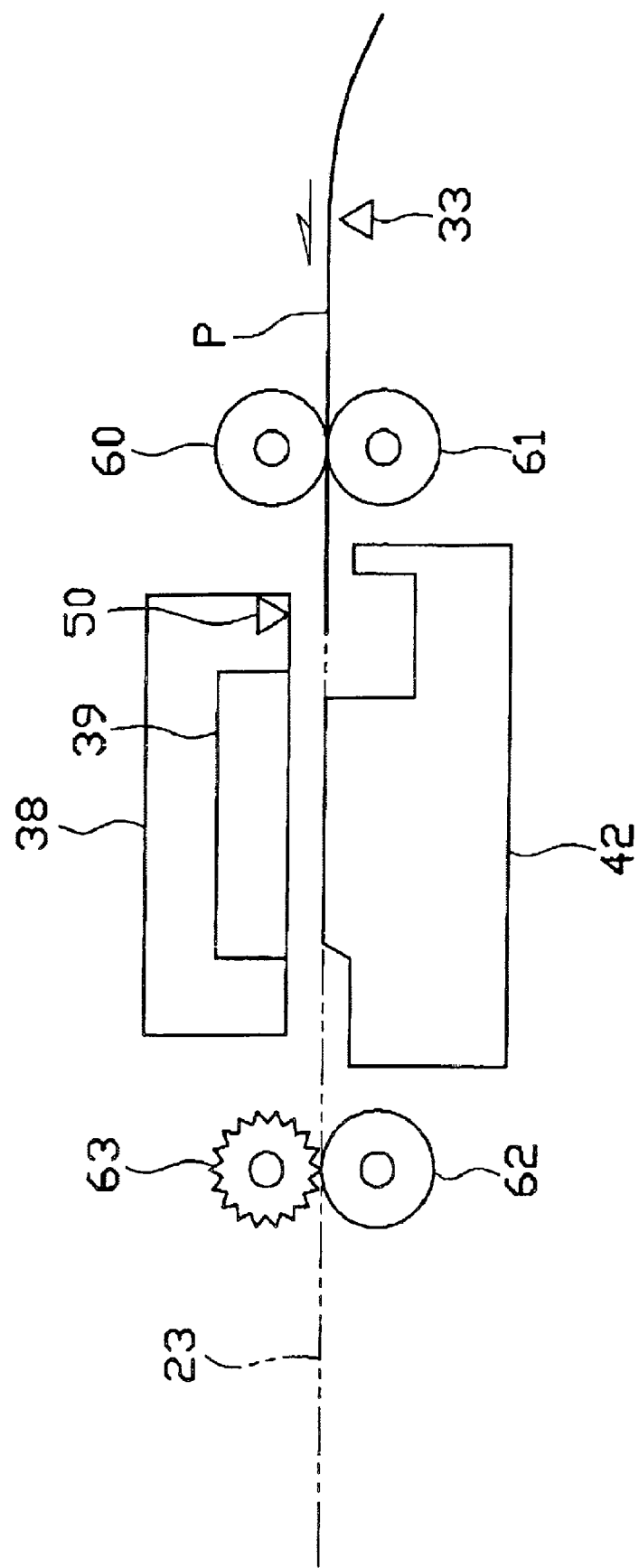
FIG. 11 is a schematic diagram showing a conveying state of a recording paper.

The controller 64 which receives the printing data, in the printer part 2 of the combined machine 1, starts feeding the recording paper P held on the paper feed tray 20 (S20), e.g., the LP motor 71 may be driven and the driving force may be transmitted to the paper feed roller 25, the conveying rollers 60 and the paper discharge rollers 62, and the recording paper P may be fed to the conveying passage 23 from the paper feed tray 20. The recording paper P may be conveyed in an inverted manner, such that the recording paper P makes a U-turn upwardly along the conveying passage 23, and the front end of the recording paper P is detected by the resist sensor 33. Then, a rotation amount inputted to the conveying roller 60 or the like after the detection of the recording paper P by the resist sensor 33 may be grasped as an encoder amount of the rotary encoder 76, and as shown in FIG. 11, the recording paper P may be conveyed until the vicinity of the front end of the recording paper P arrives at a position directly below the media sensor 50.

Figure 12:
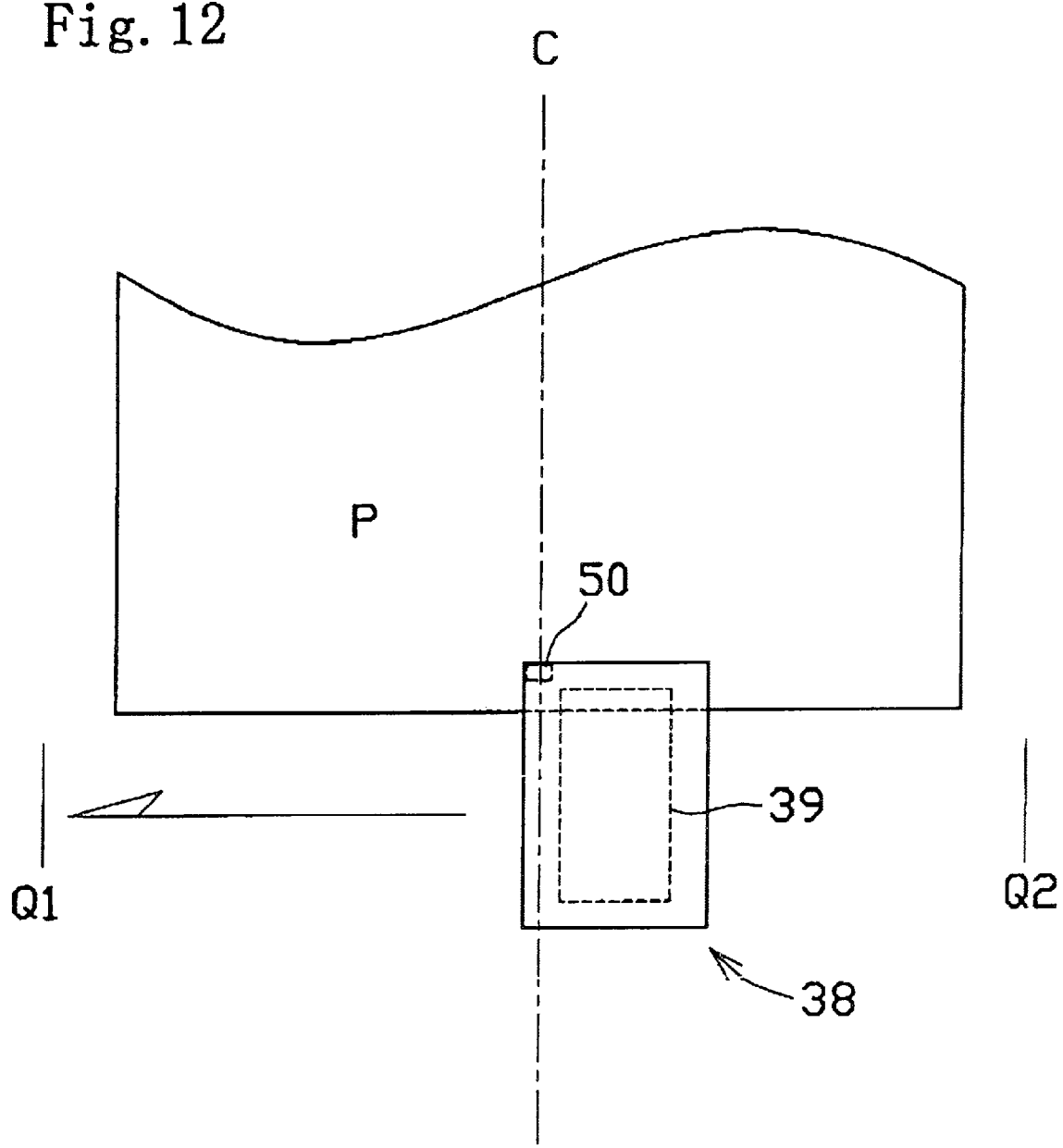
FIG. 12 is a plan view of the media sensor in the adjustment of light quantity.

Subsequently, the light quantity adjustment of the media sensor 50 may be performed in the vicinity of the front end of the recording paper P (S30). For example, as shown in FIG. 12, the scanning carriage 38 may be moved to allow the media sensor 50 to position above the center position C of the recording paper P. The center position C may be determined based on the size of the recording paper P which the recording paper information contained in the printing data indicates. Further, at the center position C, by supplying a predetermined current value to the light emitting portion 51 of the media sensor 50, the light emitting portion 51 emits light with a predetermined light emitting quantity. The light emitting quantity of the light emitting portion 51 may be suitably adjusted corresponding to a kind of the recording paper P. For example, a luster paper for photographic printing which applies predetermined treatment to a surface of paper exhibits a higher reflectance than regular paper, and therefore, the received light quantity of the light receiving portion 52 is increased. Similarly, when the color of the surface of the recording paper P differs, the received light quantity also changes. Accordingly, the light emitting quantity of the light emitting portion 51 is adjusted, such that the received light quantity of the light receiving portion 52 when the recording paper P is present is fixed.

Such adjustment of the light emitting quantity may be performed as follows. By allowing the light emitting portion 51 to emit light with an initial light emitting quantity by turning on the media sensor 50 at the center position C shown in FIG. 12, the received light quantity of the light receiving portion 52 may be obtained. The initial light emitting quantity is a light quantity which prevents the received light quantity from arriving at a target value with respect to all kinds of papers. Accordingly, with the initial light emitting quantity, the received light quantity of the light receiving portion 52 is smaller than the target value. Thereafter, the light emitting quantity of the light emitting portion 51 is increased for every light emitting quantity of a predetermined unit, and when the received light quantity of the light receiving portion 52 arrives at the target value, the light emitting quantity is determined as an adjusted value.

Next, paper edge detection may be performed in the vicinity of the front end of the recording paper P (S40). In general, in performing the image recording on the recording paper P, the printing data containing the recording paper information may be transmitted to the combined machine 1 from the computer or the like, and the size of the recording paper P may be indicated in the recording paper information. Accordingly, the controller 64 also may control the operations of the scanning carriage 38 and the recording head 39 based on the recording paper information. However, the recording paper P is not always accurately conveyed to the same position on the platen 42, and the position in the widthwise direction on the platen 42 may slightly differ for each conveying operation of respective recording papers P. Further, in case of the so-called marginless printing which performs the image recording to the periphery of the recording paper P, it is possible to eliminate the formation of a portion where the image recording is not performed at the edge of the recording paper P and, at the same time, ink which the recording head 39 ejects to the outside of the range of the recording paper P may be minimized. Therefore, by accurately grasping the edge position of the recording paper P and by controlling the operation of the scanning carriage 38 and the recording head 39 based on the edge position, it is possible to perform the image recording on the periphery of the recording paper P with accuracy.

Figure 13:
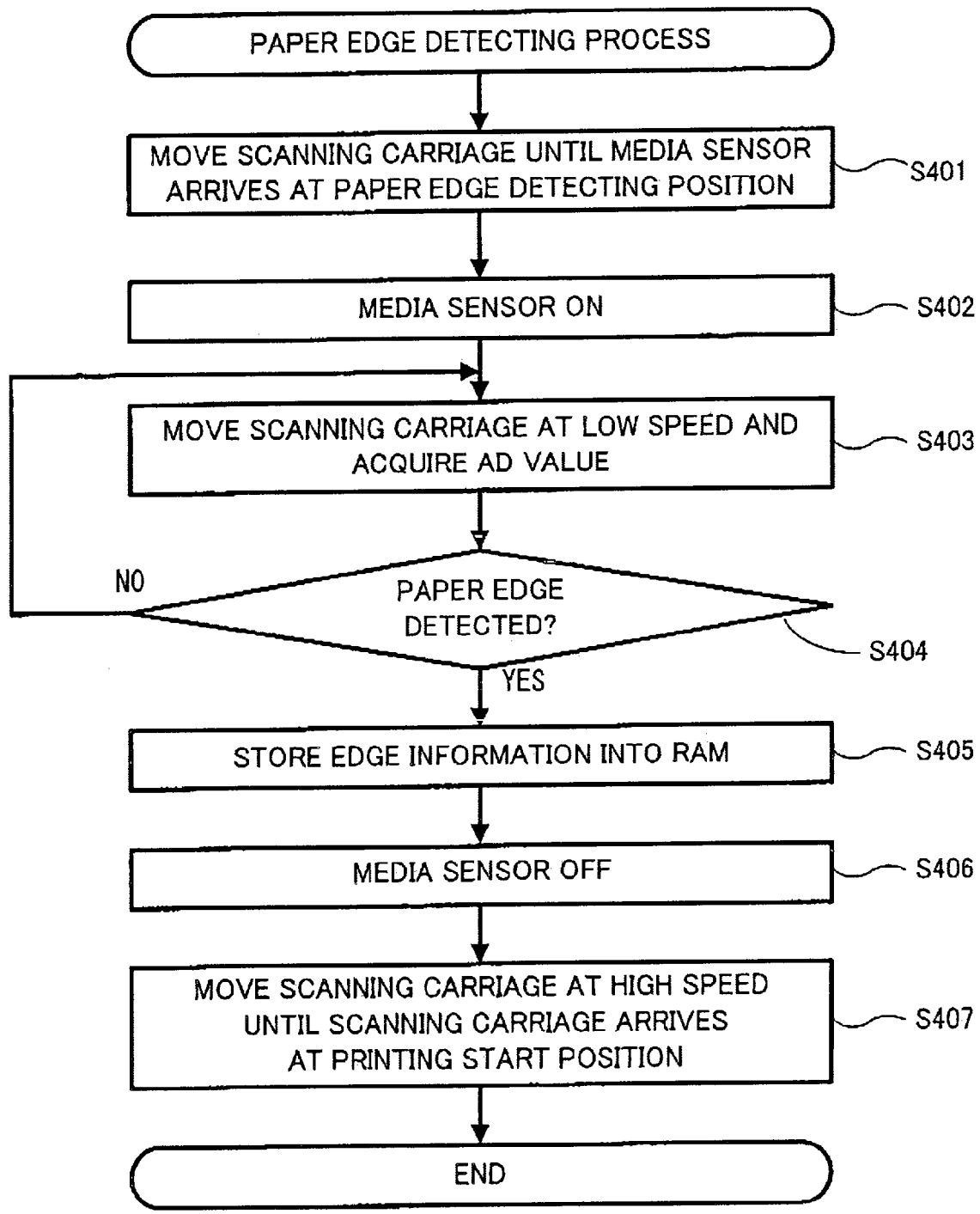
FIG. 13 is a flow chart showing a paper edge detecting process.

The paper edge detection may be performed using the media sensor 50 and the controller 64. As shown in FIG. 13, first of all, from the center position C indicated in FIG. 12, the scanning carriage 38 may be moved to the paper edge detecting start position Q1 disposed outside the range of the recording paper P (S401). Although the moving side may be either one of left and tight sides of the scanning direction, in this embodiment, the scanning carriage 38 moves to the left side in the drawing. Whether the scanning carriage 38 is positioned outside the recording paper P or not may be determined, for example, based on the recording paper size which the recording paper information contained in the printing data which is outputted from the computer indicates. Further, when the scanning carriage 38 is moved to the scanning end to which the scanning carnage 38 is movable, the scanning carriage 38 is positioned outside the range of the recording paper having the maximum width on which the image recording may be performed.

Then, the media sensor 50 may be activated (S402), and the scanning carriage 38 may be moved at the fist speed which is the low speed to the side opposite to the paper edge detecting start position Q1, that is, the right side in FIG. 12 (S403). This first speed which is the low speed is a speed which allows the media sensor 50 to detect the edge of the recording paper P with accuracy. Further, in this embodiment the low speed and the high speed indicate the relative relationship between the first speed and the second speed and do not always indicate the magnitude of the absolute speed.

To explain in more detail, the media sensor 50 irradiates light from the light emitting portion 51 with the adjusted light emitting quantity and the light receiving portion 52 receives a reflection light of the light Then, the AD value which is the output value of the light receiving portion 52 may be stored in the RAM 67 of the controller 64 correlated with the encoder quantity of the linear encoder 77 which is used as the positional information of the scanning carriage 38. Outputting of the AD value from the media sensor 50 may be performed at predetermined timing. Assuming that scanning carriage 38 is moved at the high speed, the media sensor 50 also is moved at the high speed, and therefore, a single AD value is outputted from the media sensor 50 for every several encoder quantity. In other words, the number of samples of the media sensor 50 with respect to the distance in the width direction of the recording paper P is decreased. Accordingly, the edge detecting accuracy of the recording paper P becomes coarse.

In this embodiment, as described above, the scanning carriage 38 may be moved at the first speed which is the low speed, the media sensor 50 which is mounted on the scanning carriage 38 may be also moved at the first speed. Accordingly, one AD value may be outputted from the media sensor 50 for every one encoder quantity. In other words, the number of samples of the media sensor 50 with respect to the distance in the width direction of the recording paper P is increased. Accordingly, the edge detection of the recording paper P becomes fine. In this manner, the media sensor 50 and the controller 64 may accurately detect the edge of the recording paper P.

Figure 14:
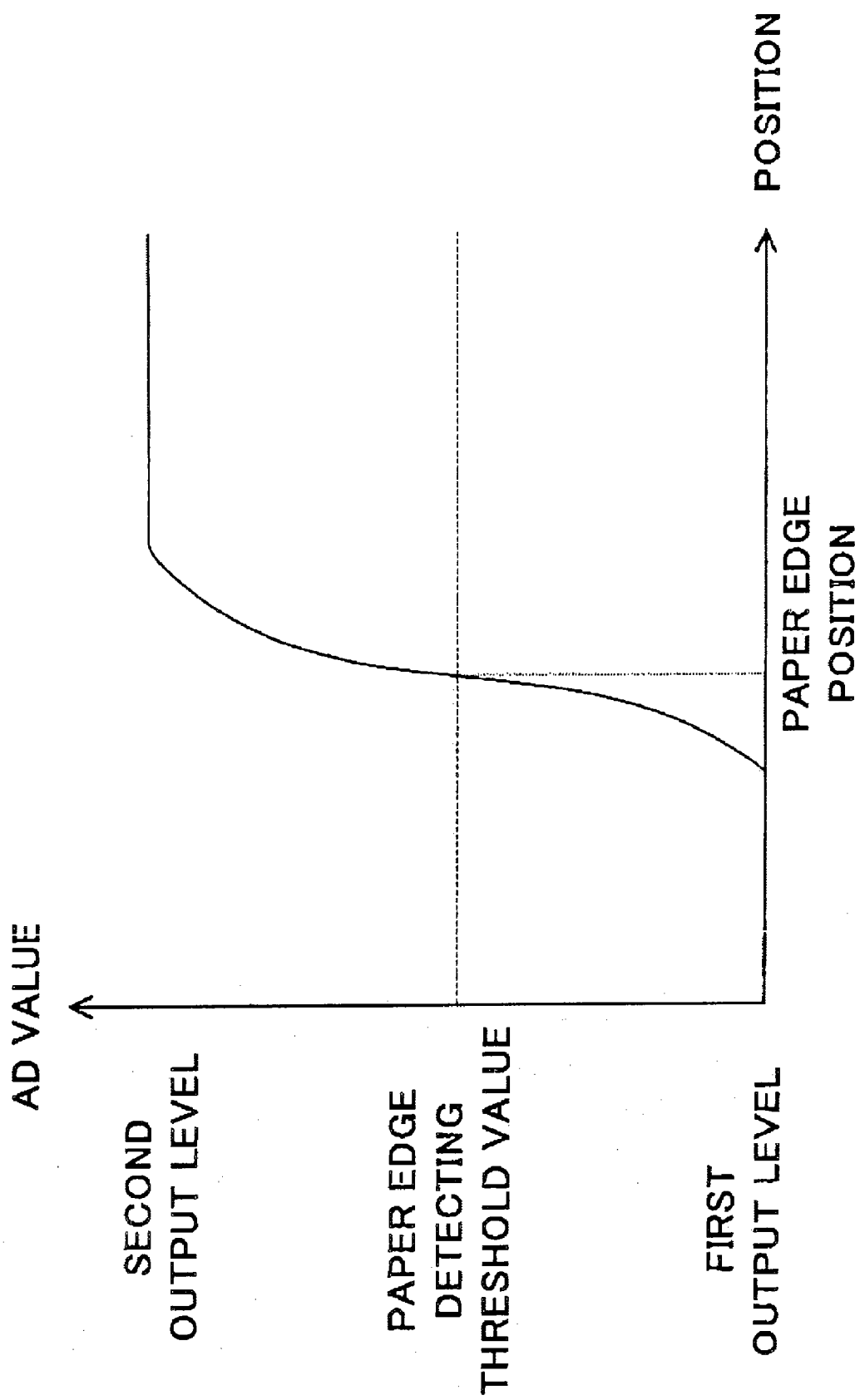
FIG. 14 is a graph showing the relationship between an AD value acquired by the media sensor and a paper edge position.

The edge detection by the controller 64 may be performed in real time with respect to the AD value which is sequentially outputted from the media sensor 50 along with the movement of the scanning carriage 38. For example, the AD value which the media sensor 50 outputs may be temporarily stored in the RAM 67, and the controller 64 detects the edge of the recording paper P based on the AD value. In the vicinity of the left edge of the recording paper P in FIG. 12, the AD value recorded in the RAM 67 exhibits a characteristic curve in the graph shown in FIG. 14. When the recording paper P is not present at the position corresponding to the media sensor 50, that is, when the light receiving portion 52 receives the reflection light from the platen 42, the AD value which the light receiving portion 52 outputs assumes the low first output level. Then, when the AD value is elevated in the vicinity of the left edge of the recording paper P and fills within the range of the recording paper P, the light receiving portion 52 receives the reflection light from the recording paper P and therefore, the AD value which the light receiving portion 52 outputs assumes the high second output level. Then, the position at which the detected AD value assumes the paper edge detecting threshold value which is set between the first output level and the second output level is determined as the paper edge position As this paper edge detecting threshold value, for example, a middle value between the first output level and the second output level may be used.

The controller 64, when the left edge of the recording paper P is detected (S404), stores the left edge position as the edge information in the RAM 67 (S405). Then, the controller 64 deactivates the media sensor 50 (S406) and allows the scanning carriage 38 to move at the second speed which is the high speed to the printing start position Q2 (S407). That is, when the left edge of the recording paper P is detected in FIG. 12, without detecting the right edge, the controller 64 allows the scanning carriage 38 positioned on the recording paper P to move to the printing start position Q2 at the second speed. Although the printing start position Q2 may be either one of the left and right sides of the recording paper P, the printing start position Q2 is set at the right side in this embodiment. Further, the second speed is a speed which is faster than the first speed. In this movement, the media sensor 50 is deactivated, and therefore, the AD value is not outputted. Further, the image recording which ejects ink from the recording head 39 also is not performed. Accordingly, the scanning carriage 38 may be moved as fast as possible without taking detecting accuracy or the like into consideration. In this manner, compared to a case in which the scanning is performed with the media sensor 50 over the whole region of the paper width of the recording paper P, the amount of time for edge detection may be reduced. Further, since the AD value is not outputted from the media sensor 50, it is unnecessary to store the AD value in the RAM 67. Accordingly, the storing region of the RAM 67 for temporarily storing the AD value may be reduced.

Figure 10:
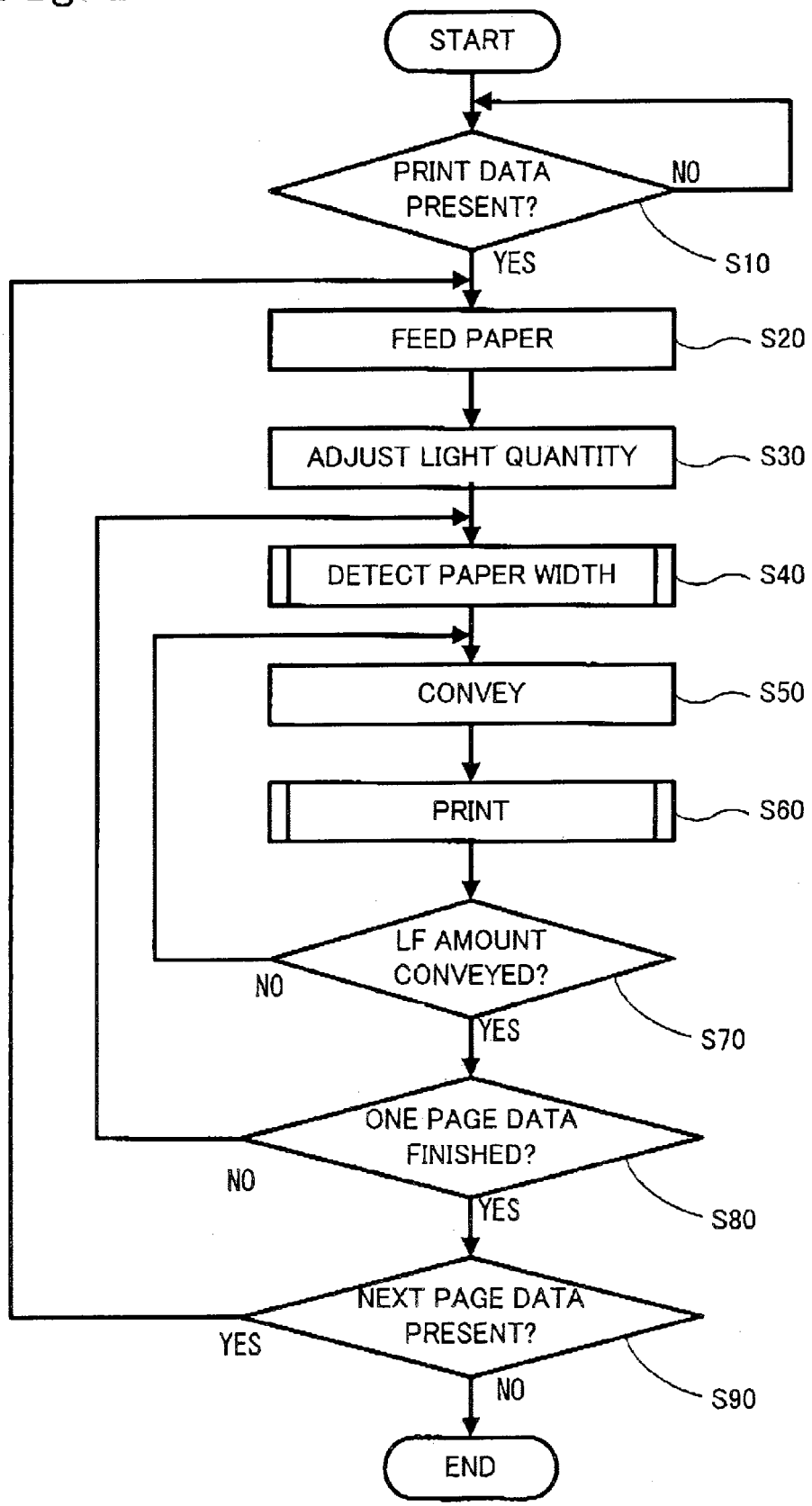
FIG. 10 is a flow chart showing a printing operation of the combined machine.
Figure 15:
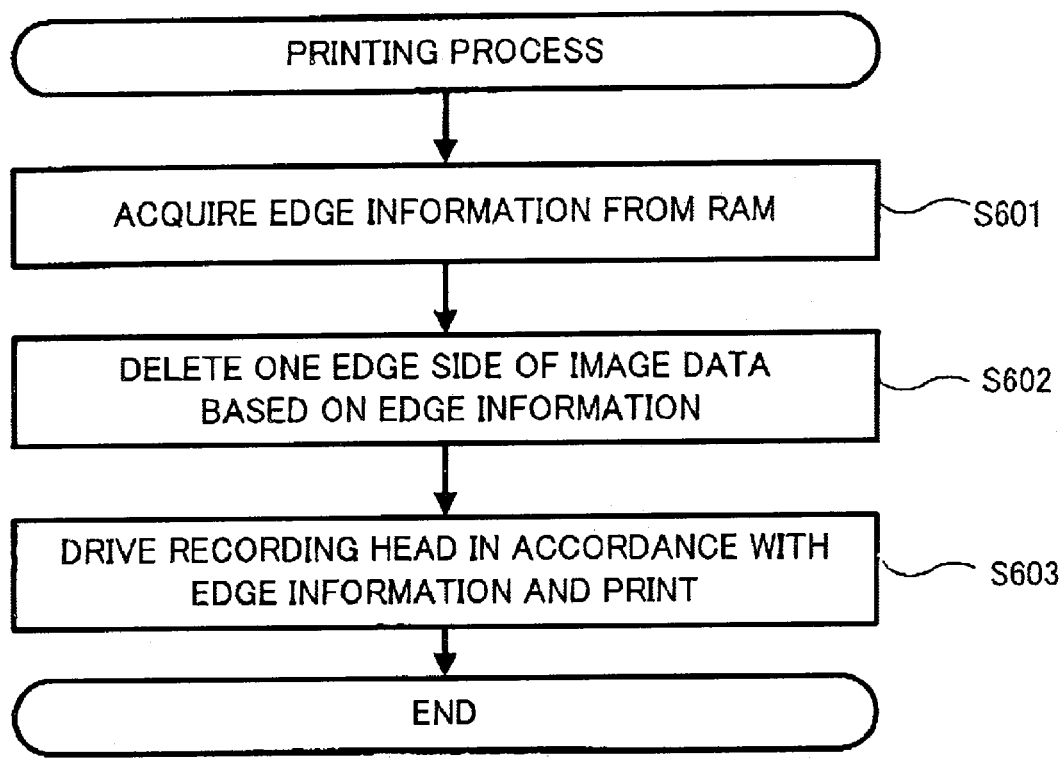
FIG. 15 is a flow chart showing a printing process.

Next, as shown in FIG. 10, the recording paper P may be conveyed by an amount of linefeed width (S50). Then, ink may be ejected from the recording head 39 while moving the scanning carriage 38 which stands by at the printing start position Q2 thus performing the printing on the recording paper P (S60). The printing using the recording head 39 may be performed either in the reciprocating direction of the scanning carriage 38 or in one direction of the scanning carriage 38. To be more specific, as shown in FIG. 15, the edge information of the recording paper P stored in the RAM 67 may be read (S601), and based on the left edge position of the recording paper P contained in the edge information, the image data which drops out from the left edge may be deleted (S602).

Figure 16:
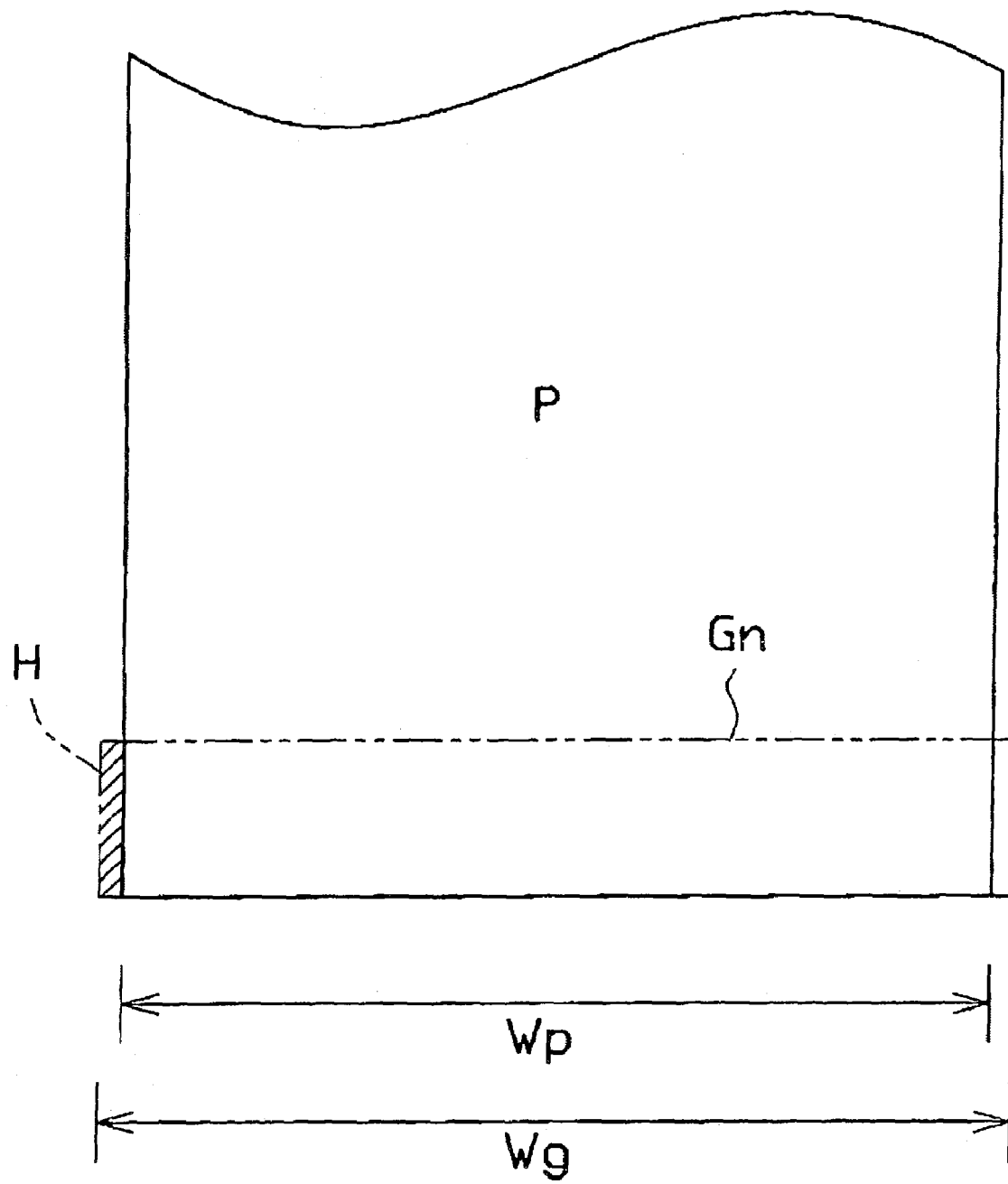
FIG. 16 is a schematic diagram showing a region H which is deleted from image data Gn.

As shown in FIG. 16, the image data nay be outputted as the image data Gn for every band unit corresponding to one linefeed width. In performing the marginless printing, by setting the width Wg of the recording image based on the image data Gn slightly wider than the paper width. Wp of the recording paper P, it is possible to obtain an advantage that printing is not performed on the periphery of the recording paper P and the so-called residual whiteness is generated. On the other hand, when the width Wg of the recording image is set excessively larger than the width Wp of the recording paper P, ink is also ejected from the recording head 39 to positions which drop out from both edges of the recording paper P, thus giving rise to the undesired situation that the platen 42 is smeared or the ink mist is generated.

Accordingly, out of the image data Gn, a region H which drops out from the left edge of the recording paper P may be deleted. In other words, the recording head 39 is controlled, such that with respect to the image data Gn of the portion which corresponds to the region H, the image recording is performed at the left edge position of the recording paper P by preventing the ejection of the ink from the recording head 39 while with respect to the portion which drops out from the right edge of the recording paper P, the image; recording is performed by dropping out to the outside of the right edge of the recording paper P (S603). By deleting the region H which drops out from the left edge of the recording paper P, it is possible to accurately perform the image recording at the periphery of the left edge of the recording paper P. On the other hand, the image data which drops out from the right edge of the recording paper P is printed in a drop-out manner and therefore, it is possible to prevent the occurrence of residual whiteness at the periphery of the right edge.

Here, when there exists no-region H which drops out from the left edge of the recording paper P out of the image data Gn due to the displacement of the conveying position of the recording paper P or the like, as a matter of course, the deletion of the image data Gn is not performed. Further, when the displacement of the conveying position of the recording paper P is generated the centering may be preliminarily performed by calculating the center position based on the left edge position of the recording paper P and, thereafter, by aligning the center position of the recording paper P and the center position of the image data Gn.

When the image recording of the image data. Gn of an amount corresponding to one linefeed width is finished, the controller 64 determines whether or not the recording paper P is conveyed by a predetermined conveying (LF) quantity (S70). This predetermined conveying quantity may be used for judging whether the recording paper P arrives at the position where the edge detection is performed. For example, as indicated by a dotted line in FIG. 17, due to the reciprocal movement of the scanning carriage 38, the recording head 39 may be used for scanning in the width direction of the recording paper P and the scanning may be performed for every transfer of the recording paper P in the conveying direction with a predetermined linefeed width. Accordingly, the recording head 39 may move along a path which is indicated by a dotted line with respect to the recording paper P.

Then, as described previously, after the paper edge detection is performed at the front-end position P1 of the recording paper P, the paper edge detection again may be performed at positions P2, P3, . . . which are spaced apart from the recording paper P by predetermined distances in the conveying direction. The predetermined conveying quantities correspond to the distances between the respective positions P1, P2, P3 . . . at which the paper edge detection is performed. For example, after the paper edge detection (S40) is performed at the front-end position P1 of the recording paper P, the recording head 39 performs the printing by performing the scanning in the width direction of the recording paper P along the dotted line in the drawing (S60). Even when the printing is preformed by a single linefeed width, the media sensor 50 does not arrive at the position P2 at which the paper edge detection is to be performed next, that is, the media sensor 50 is not conveyed by the predetermined conveying quantity (S70), and further, the printing data amounting to one page is not yet finished (S80). Accordingly, the conveyance of the recording paper P amounting to one linefeed width is performed (S50) and the printing is performed again (S60). Then, after the printing amounting to four linefeed width is performed from the front end of the recording paper P, the media sensor 50 arrives at the position P2. That is, since the recording paper P is conveyed by the predetermined conveying quantity (S70), the paper edge detection is performed in the same manner as previously described (S40). Here, when the recording paper P is conveyed by the predetermined conveying quantity, the counting of the conveying quantity may be reset.

After the paper edge detection is performed at the position P2, the printing (S60) using the recording head 39 may be performed based on the edge information obtained at the position P2. In the same manner, the conveyance for every linefeed (S50) and the printing (60) may be performed until the media sensor 50 arrives at the position P3. When the media sensor 50 arrives at the position P3, the paper edge detection (S40) may be performed. Thereafter, the printing (S60) by the recording head 39 may be performed based on the edge information obtained at the position P3.

In this manner, by performing the paper edge detection at the predetermined distance over the conveying direction of the recording paper P and by performing the image recording based on the obtained respective edge information, even when the recording paper P is arranged obliquely with respect to the conveying direction, it is possible to perform the image recording on the edge of the recording paper P with accuracy based on the respective edge information.

Then, the printing data amounting to one page is finished (S80), and it is determined whether the printing data of the next page is transmitted from the computer or the like (S90). When the image to be recorded amounts to a single page, after finishing the image recording of the image data amounting to one page, the image recording operation is finished. On the other hand, when the printing data of next page is present, the recording paper P may be fed again (S20) and, thereafter, the image recording operation may be performed in the same manner as the above-described operation.

In this manner, according to medium position determining device which is realized by the combined machine 1 of this embodiment, the scanning carriage 38 may be moved at the first speed which is a low speed in the vicinity of one edge of the recording paper P, thus realizing accurate detection of one edge of the recording paper P, and after the detection of one edge, the scanning carriage 38 may be moved at the second speed which is a high speed, thus shortening the moving time whereby the edge detection of the recording paper may be performed accurately and rapidly. Further, the combined machine 1 may, based on the obtained edge position, accurately record the image data on the recording paper P. Particularly, at the time of performing the marginless printing on the recording paper P, it is possible to perform the image recording on the periphery of the edge of the recording paper P with accuracy.

Hereinafter, the second embodiment is explained. In the first embodiment, as shown in FIG. 13, the scanning carriage 38 is moved at the first speed, the AD value is acquired by the media sensor 50, and the edge detection is performed with respect to the AD value in real time by the controller 64. In this embodiment, the AD value which the media sensor 50 outputs is stored in the RAM 67, and upon completion of the acquisition of the AD value using the media sensor 50, the edge detection of the recording paper P is performed by the controller 64. Accordingly, the media sensor 50 is moved at the first speed which is a low speed in the vicinity of one edge of the recording paper P, and after arriving at a predetermined position of the recording paper P, is moved at the second speed which is a high speed. The second embodiment is substantially similar to the first embodiment. Therefore, only those differences between the second embodiment and the first embodiment are described with respect to the second embodiment.

In the second embodiment, the paper edge detecting process is different than in the first embodiment. In the second embodiment, as shown in FIG. 10, when the printing data is transmitted to the controller 64 from a computer or a small-sized memory card (S10), the controller 64, in the printer part 2 of the combined machine 1, starts the feeding of recording paper P held in the feed tray 20 (S20), and thereafter, the controller 64 performs the adjustment of light quantity of the media sensor 50 in the vicinity of the front end of the recording paper P (S30). Thereafter, the paper edge detecting process of the second embodiment is performed.

Figure 18:
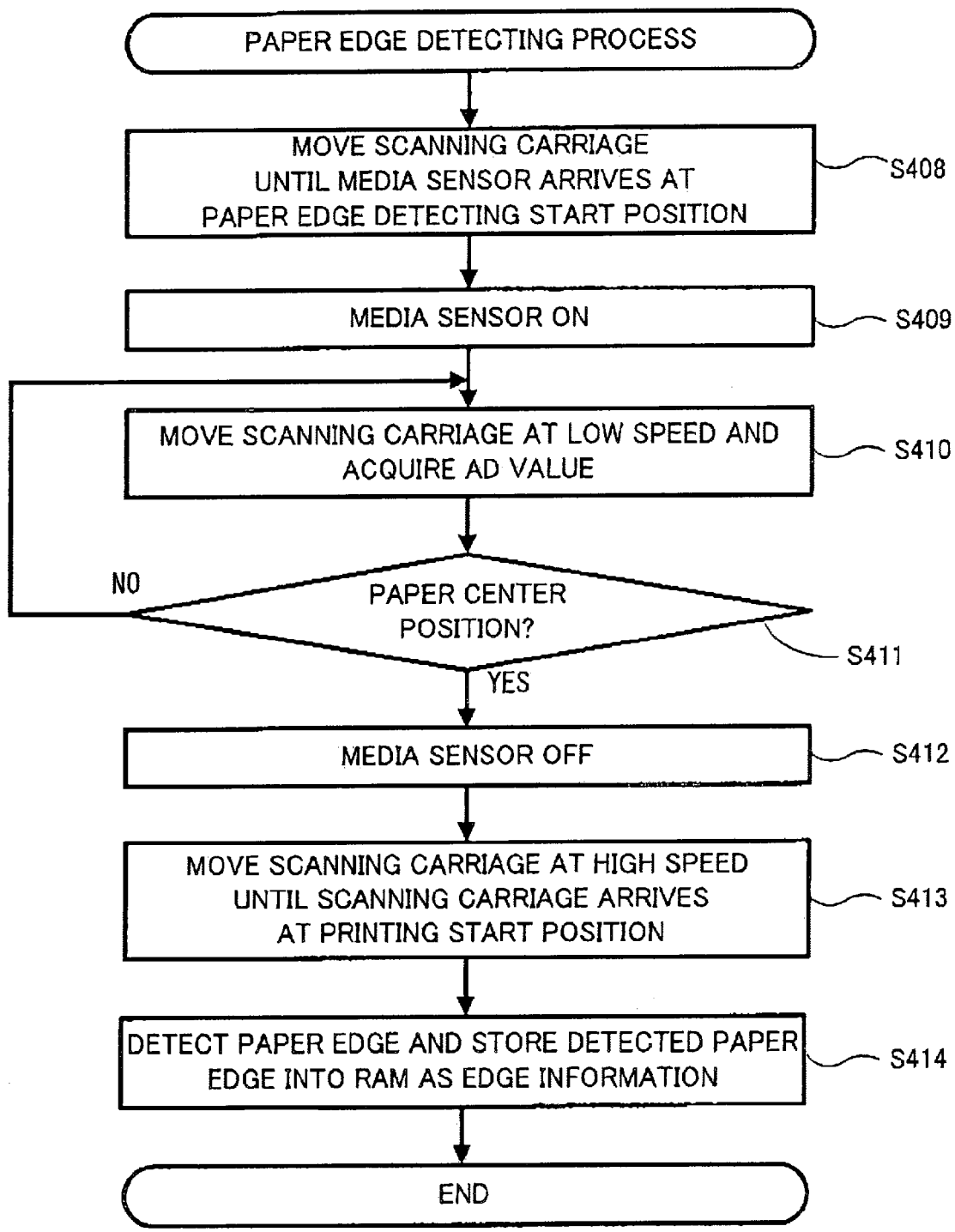
FIG. 18 is a flow chart showing a paper edge detecting process according to a second embodiment.

In the paper edge detecting process, as shown in FIG. 18, the scanning carriage 38 may be moved to a paper edge detecting start position Q1 which is arranged outside the range of the recording paper P from a center position C (see FIG. 12) where the light quantity adjustment is performed (S408). Then, the media sensor 50 may be activated, (S409), the scanning carriage 38 may be moved at the first speed which is a low speed to a side opposite to the paper edge detecting start position Q1, that is, the right side in FIG. 12 (S410). This first speed is a speed which allows the media sensor 50 to accurately detect the edge of the recording paper P in the same manner as the first embodiment. Accordingly, the edge detection of the recording paper P becomes accurate, and the media sensor 50 and the controller 64 may accurately detect the edge of the recording paper P.

In this embodiment, when the media sensor 50 outputs the AD value during scanning, the controller 64 does not perform the edge detection. Accordingly, the AD value which the media sensor 50 outputs is sequentially stored in the RAM 67 while being correlated with the encoder amount of the linear encoder 77 which indicates the position of the scanning carriage 38. Then, the scanning carriage 38 is moved to the center position C of the recording paper P at the first speed. Since the left edge of the recording paper P always exists in the course to the center position C in the width direction, and therefore, by allowing the scanning carriage 38 to move to the center position C from the paper edge detecting start position Q1 and by acquiring the AD value using the media sensor 50, it is possible to detect the left edge of the recording paper P based on the AD value. Such a center position C of the recording paper P is, in the same manner as the adjustment of the light amount, determined based on the size of the recording paper P which the recording paper information contained in the printing data outputted from the external information device, such as a computer indicates.

Further, when the scanning carriage 38 arrives at the center position C of the recording paper P (S411), the media sensor 50 is deactivated (S412), and the scanning carriage 38 is moved to the printing start position Q2 at the second speed which is a high speed (S413). The second speed is greater than the first speed. The media sensor 50 is deactivated and does not output the AD value during this movement and at the same time, the image recording which ejects ink from the recording heads 39 also is not performed, and therefore, the scanning carriage 38 may be moved as fast as possible. Accordingly, compared to a case in which the scanning is performed using the media sensor 50 over the whole region of the paper width of the recording paper P, the amount of time for edge detection may be reduced. Further, because the AD value is not outputted from the media sensor 50, it is unnecessary to store the AD value in the RAM 67. Accordingly, it is possible to reduce a storing region of the RAM 67 which temporarily stores the AD value.

Subsequently, the controller 64 detects the edge of the recording paper P based on the AD value stored in the RAM 67. This edge detection may be performed simultaneously with the movement of the scanning carriage 38 at the second speed, or after the scanning carriage 38 arrives at the printing start position Q2. The edge detecting method is substantially similar to the edge detecting method of the first embodiment, in which the paper edge position is determined based on the paper edge detecting threshold value in view of the AD value shown in FIG. 14. Further, the controller 64 allows the RAM 67 to store the detected left edge of the recording paper P as the edge information (S414).

Figure 17:
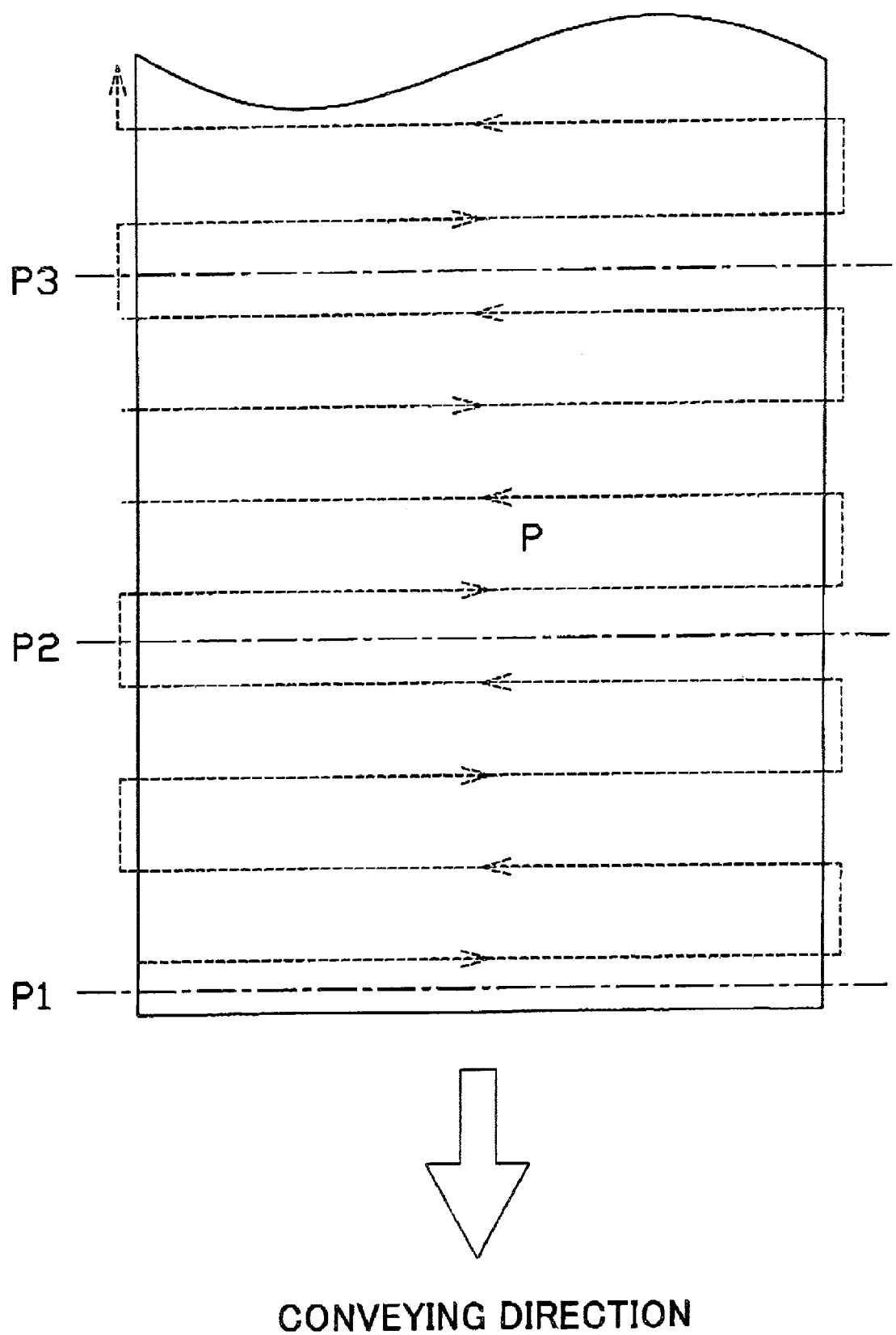
FIG. 17 is a schematic diagram showing a position on the recording paper at which the paper edge detection is performed.

The image recording operation which is performed after the completion of the paper edge detection is substantially similar to the corresponding image recording operation of the first embodiment. That is, as shown in FIG. 10, the recording paper P is conveyed by the linefeed width (S50), and the scanning carriage 38 which stands by at the printing start position Q2 is moved, and at the same time, ink is ejected from the recording head 39 so as to perform the printing on the recording paper P (S60). In this printing, the edge information of the recording paper P stored in the RAM 67 is read, and based on the left edge position of the recording paper P contained in the edge information, the recording head 39 is controlled such that ink is not ejected to the recording head 39 with respect to the image data which drops out from the left edge, while the image recording is performed in a state that the image drops out to the outside of the right edge of the recording paper P with respect to a portion which drops out from the right edge of the recording paper P. Further, the paper edge detecting process is, as shown in FIG. 17, with respect to the recording paper P, performed at each of positions P1, P2, P3, . . . which are spaced apart from each other at a predetermined interval in the conveying direction, and after performing the paper edge detection at the respective positions, the printing using the recording head 39 is performed based on the edge information obtained at these positions.

In this manner, according to the medium position determining device which is realized by this combined machine 1, the scanning carriage 38 is moved at the first speed which is a low speed in the vicinity of one edge of the recording paper P, and the scanning carriage 38 is moved at the second speed which is a high speed after the center position C of the recording paper P, and therefore, one edge of the recording paper P may be detected, and at the same time, the moving time of the scanning carriage 38 may be reduced and it is possible to perform edge detection of the recording paper P accurately and rapidly. Further, the combined machine 1 way, based on the acquired edge position, accurately record the image data on the recording paper P. Particularly, at the time of performing the marginless printing on the recording paper P, it is possible to perform the image recording on the periphery of the edge of the recording paper P with accuracy.

The third embodiment is explained hereinafter. In the second embodiment, to allow the scanning carriage 38 to move to the center position C of the recording paper P at the first speed, the center position C is determined based on the size of the recording paper P which the recording paper information contained in the printing data outputted from the external information device. However, in the third embodiment, the recording paper P is conveyed in a state that the approximate center in the width direction passes above a reference line L along the conveying direction, and the scanning carriage 38 is moved to the reference line L at the first speed. The third embodiment is substantially the same as the second embodiment except for the range in which the scanning carriage 38 is moved at the first speed. Therefore, only the differences between the third embodiment and the second embodiment are discussed with respect to the third embodiment.

Figure 19:
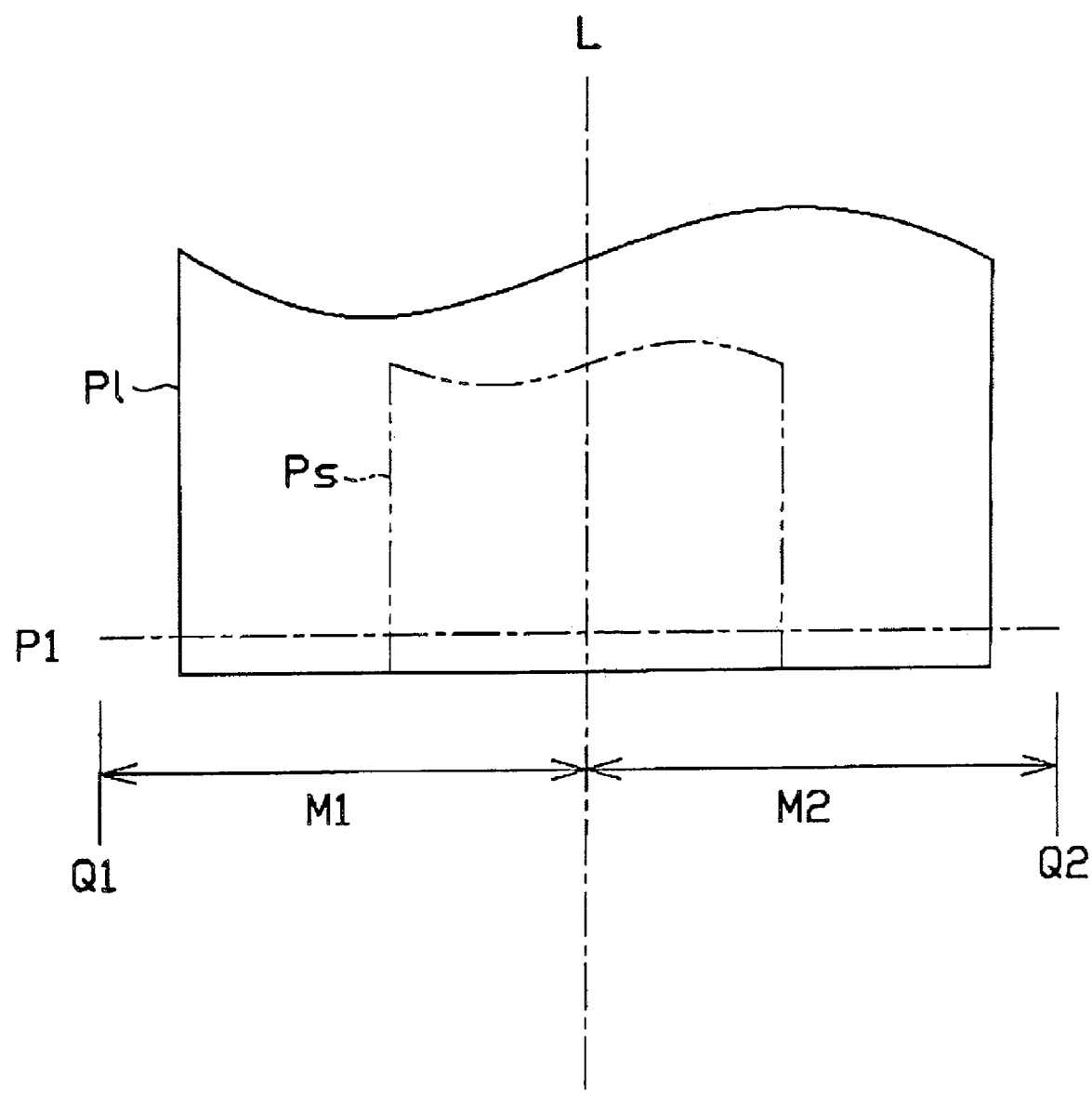
FIG. 19 is a schematic diagram showing a range in which the scanning carriage is moved at a first speed or at a second speed according to a third embodiment.

In the third embodiment, as shown in FIG. 19, a recording paper P1 having a large size and a recording paper Ps having a small size are conveyed in a state that the centers thereof in the width direction are positioned above the reference line L at the center of the conveying passage 23, that is, both recording papers P1, Ps are conveyed in the so-called center registration, and the center positions of recording papers P of all sizes are arranged on the reference line L. Accordingly, by allowing the scanning carriage 38 to move at the first speed which is a low speed in a range M1 from the paper edge detecting start position Q1 to the reference line L, and by acquiring the AD value using the media sensor 50, even when the recording paper is either the recording paper P1 having a large size or the recording paper Ps having a small size, the left edge is always positioned within the range M1, and therefore, it is possible to detect the left edges of the recording papers P of all sizes.

Further, irrespective of the size of the recording paper P, the finishing position to which the scanning carriage 38 is moved at the first speed is fixed, and therefore, the scanning carnage 38 readily may be controlled. Further, it is possible to set the finishing position to which the scanning carriage 39 is moved at the first speed independent of the printing data outputted from the computer, and therefore, even when the size of the recording paper P which is inputted to a printer driver preinstalled in the computer, for example, and the size of the recording paper P fed to the combined machine 1 differ from each other, it is possible to detect the edge of the recording paper P which is actually fed.

Further, when the printing start position Q2 is arranged on the right side as shown in the drawing, the scanning carriage, 38 may be moved at the second speed which is a high speed in a range M2 shown in the drawing. Accordingly, in the same manner as in the second embodiment, the edge detection of the recording paper P may be accurately and rapidly performed, and at the same time, it is possible to accurately record the image data on the recording paper P based on the acquired edge position.

Hereinafter, a fourth embodiment is explained. In the third embodiment, the recording paper P is conveyed such that he approximate center in the width direction passes above the reference line L along the conveying direction, and the scanning carriage 38 is moved to the reference line L at the first speed. In this embodiment, the recording paper P is conveyed, such that the edge opposite to the detected edge passes above the reference line L along the conveying direction, and the scanning carriage 38 is moved to a predetermined position from a scanning edge side opposite to the reference line L at the first speed. The fourth embodiment is substantially the same as the second embodiment except for the range in which the scanning carriage 38 is moved at the first speed. Therefore, only the differences between the fourth embodiment and the second embodiment are discussed with respect to the fourth embodiment.

Figure 20:
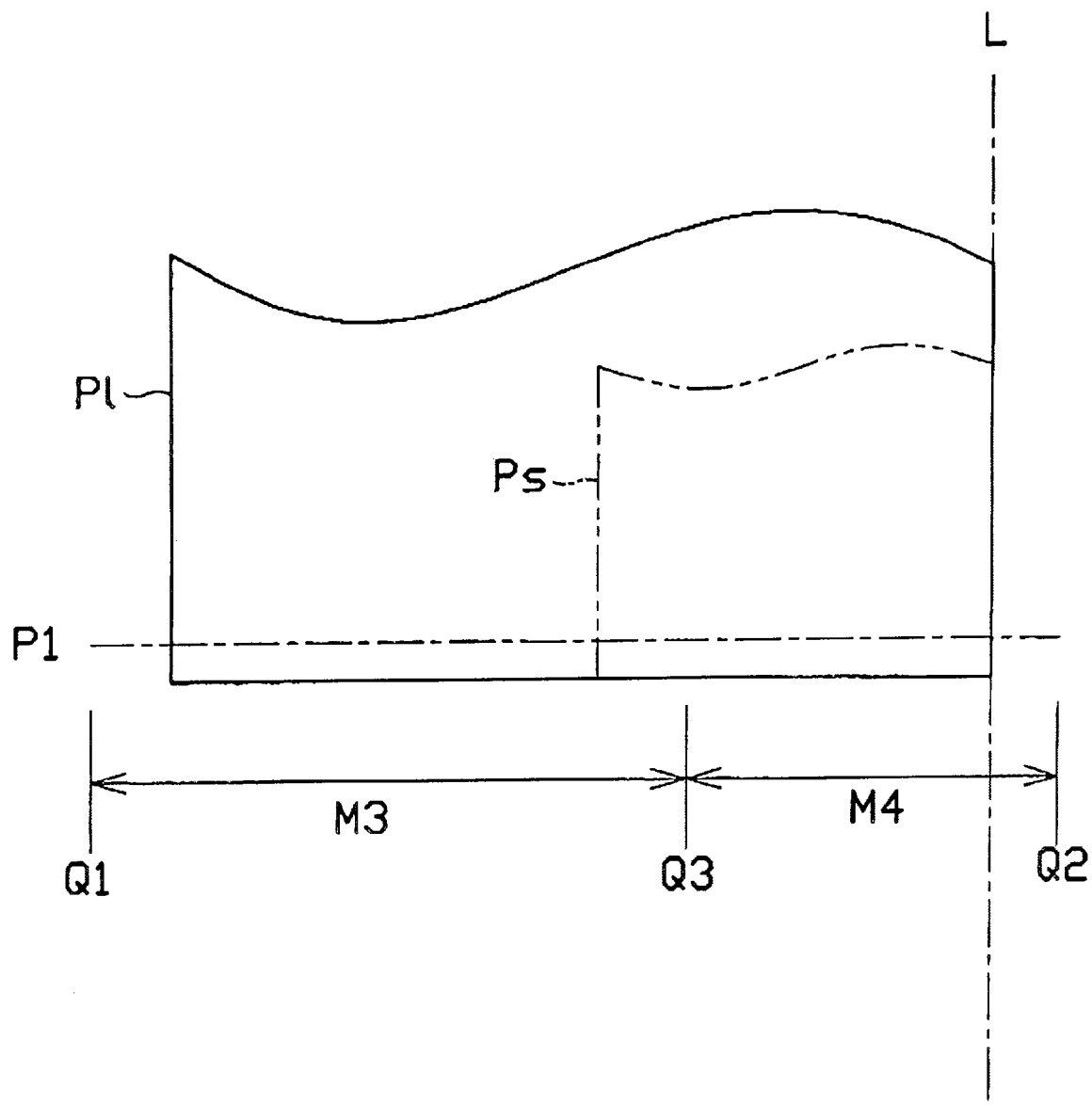
FIG. 20 is a schematic diagram showing a range in which the scanning carriage is moved at the first speed or at the second speed according to a fourth embodiment.

In the fourth embodiment, as shown in FIG. 20, a recording paper P1 having a large size and a recording paper Ps having a small size are conveyed, such that one-edge sides, that is, right edges in the drawing, are positioned above the reference line L at one-edge side of the conveying passage 23, that is, both recording papers P1 and Ps are conveyed in the so-called side registration. Accordingly, assuming the recording paper having a minimum size on which image recording is performed using the combined machine 1 of this embodiment as the recording paper Ps, using the edge side opposite to the reference line L of the recording paper Ps as the paper edge detecting start position Q1 the scanning carriage 38 is moved at the first speed which is a low speed in a range M3 from the paper edge detecting start position Q1 to the position Q3 which is arranged closer to the reference line L than the position at which the left edge of the recording paper Ps passes, and the AD value is acquired using the media sensor 50. Since the left edges of the recording papers P having all sizes larger than the minimum size of the recording paper Ps are positioned within the range M3, it is possible to detect the left edges of the recording papers P of all sizes. Further, irrespective of the size of the recording paper P, the finishing position to which the scanning carrier 38 is moved at the first speed is fixed, and therefore, the scanning carriage 38 readily may be controlled. Further, within a range M4 from the position Q3 to the printing start position Q2, the scanning carriage 38 is moved at the second speed which is a high speed.

Accordingly, the advantages of the fourth embodiment may be substantially similar to the advantages of the second embodiment. Further, the finishing position to which the scanning carriage 38 is moved at the first speed may be set independent of the printing data outputted from the computer, and therefore, even when the size of the recording paper P which is inputted by a printer driver preinstalled in the computer differs from the size of the recording paper P fed to the combined machine 1, for example, it is possible to detect the edge of the recording paper P which is actually fed. Further, the drop-out printing is performed on the reference line L side on the recording paper P and the reference line L is the fixed position, and therefore, by providing an ink absorbing member which absorbs ink used for the drop-out printing at the position corresponding to the reference line L of the platen 42, the occurrence of the smear or ink mist on the platen 42 due to the dropout printing may be prevented.

Hereinafter, a fifth embodiment is explained. In the first to fourth embodiments, a single edge of the recording paper P is detected. In the fifth embodiment, both edges of the recording paper P may be detected.

The image recording operation of the fifth embodiment is substantially similar to the corresponding image recording operation of the first embodiment, except for the paper edge detecting process and the printing process. That is, as shown in a flow chart in FIG. 10, when the printing data is transmitted to the controller 64 from a computer or a small-sized memory card (S10), the controller 64, in the printer part 2 of the combined machine 1, starts the feeding of recording paper P held in the paper feed tray 20 (S20), and thereafter, the controller 64 performs the adjustment of light quantity of the media sensor 50 in the vicinity of the front end of the recording paper P (S30). Thereafter, the paper edge detecting process of the fifth embodiment is performed.

Figure 21:
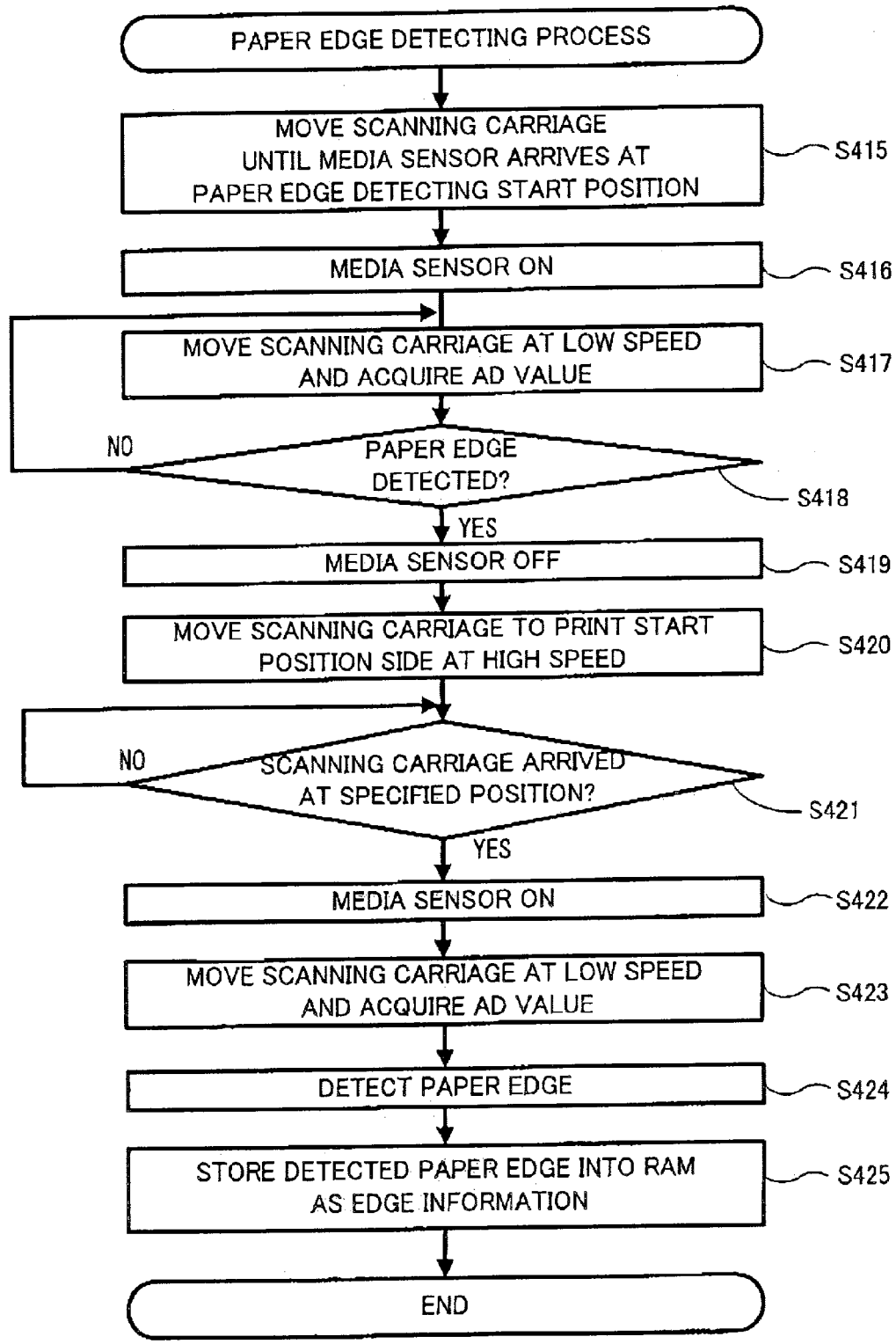
FIG. 21 is a flow chart showing paper edge detecting process according to a fifth embodiment.

In the paper edge detecting process, as shown in FIG. 21, the scanning carriage 38 is moved from the center position C (see FIG. 12) where the light quantity adjustment is performed to the paper edge detecting start position Q1 which is outside the range of the recording paper P (S415). Then, the media sensor 50 is activated (S416), and the scanning carriage 38 is moved to the side opposite to the paper edge detecting start position Q1, that is, to the right side in FIG. 22 at the first speed which is a low speed, and the AD value is acquired (S417). The first speed is a speed which allows the media sensor 50 to detect the edge of the recording paper P with accuracy. Accordingly, the edge detection of the recording paper P becomes fine, and the edge detecting unit which comprises the media sensor 50 and the controller 64 may accurately detect the edge of the recording paper P.

The edge detection by the controller 64 is, in substantially same manner as the first embodiment, performed with respect to the AD value which is sequentially outputted from the media sensor 50 along with the movement of the scanning carriage 38 in real time. That is, the AD value which the media sensor 50 outputs is temporarily stored in the RAM 67 and the controller 64 detects the edge of the recording paper P based on the AD value. In the vicinity of the left edge of the recording paper P, the AD value recorded in the RAM 67 exhibits a characteristic curve in the graph shown in FIG. 14, and therefore, the position where the AD value assumes the paper edge detecting threshold value is determined as the paper edge position.

Figure 22:
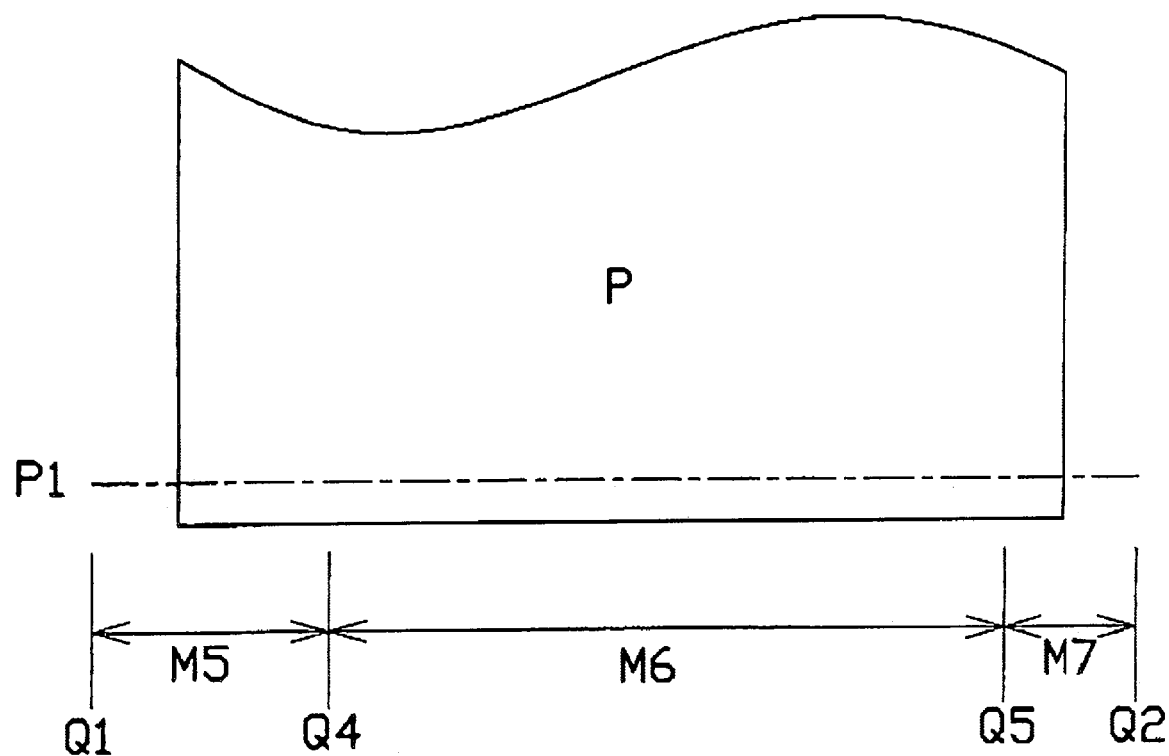
FIG. 22 is a schematic diagram showing a range in which the scanning carriage is moved at the first speed or at the second speed in the fifth embodiment.

When the controller 64 detects the left edge of the recording paper P (S418), the controller 64 allows the RAM 67 to store the left edge position as edge information and deactivates the media sensor 50 (S419). Accordingly, as shown in FIG. 22, in performing the paper edge detection at a front end position P1 of the recording paper P, assuming that the controller 64 detects the left edge of the recording paper P when the scanning carriage 38 arrives at the position Q4, in a range M5 from the paper edge detecting start position Q1 to the position Q4, the scanning carriage 38 is moved at the first speed which is a low speed.

Then, the scanning carriage 38 is moved to the printing start position Q2 from the position Q4 at the second speed which is a high speed (S420). The second speed is a speed that is greater than the first speed. During such movement, the media sensor 50 is not active, and the AD value is not outputted, and at the same time, the image recording which ejects ink from the recording head 39 also is not performed, and the scanning carriage 38 may be moved as fast as possible.

Then, when the scanning carriage 38 arrives at the position Q5 (S421), the media sensor 50 is again activated (S422), and the scanning carriage 38 is moved at the first speed which is a low speed (S423). The position Q5 is set based on the already detected left edge position of the recording paper P and the size of the recording paper P which the recording paper information contained in the printing data. That is, it is estimated that the right edge position of the recording paper P is positioned at a position away from the left edge position of the recording paper P by an amount of the paper width of the recording paper P in the scanning direction and therefore, the position Q5 may be set closer to the center side of the paper than the estimated right edge position.

Then, in a range M7 from the position Q to the printing start position Q2, the scanning carriage 38 is moved at the first speed which is a low speed and the media sensor 50 acquires the AD value (A423). The controller 64 performs the edge detection in the substantially same manner as previously described with respect to the AD value which is sequentially outputted from the media sensor 50 along with the movement of the scanning carriage 38 in real time. Then, when the controller 64 detects the right edge of the recording paper P (S424), the controller 64 allows the RAM 67 to store the right edge position as edge information (S425).

In this manner, in the paper edge detection, in the range M6 on the center side of the recording paper P, the scanning carriage 38 is moved at the second speed which is a high speed, and compared to a case in which the scanning is performed using the media sensor 50 over the whole region of the paper width of the recording paper P at a speed suitable for performing the edge detection, the amount of time for edge detection may be reduced. Further, because the AD value is not outputted from the media sensor 50, in allowing the scanning carriage 38 to move at the second speed, it is unnecessary to store the AD value in the RAM 67. Accordingly, it is possible to reduce a storing region of the RAM 67 which temporarily stores the AD value. Here, in the fifth embodiment, the scanning carriage 38 is moved at the first speed in the range M7 from the position Q5 to the printing star position Q2. However, after the right edge of the recording paper P is detected, the scanning carriage 38 may be moved to the printing start position Q2 at the second speed.

Figure 23:
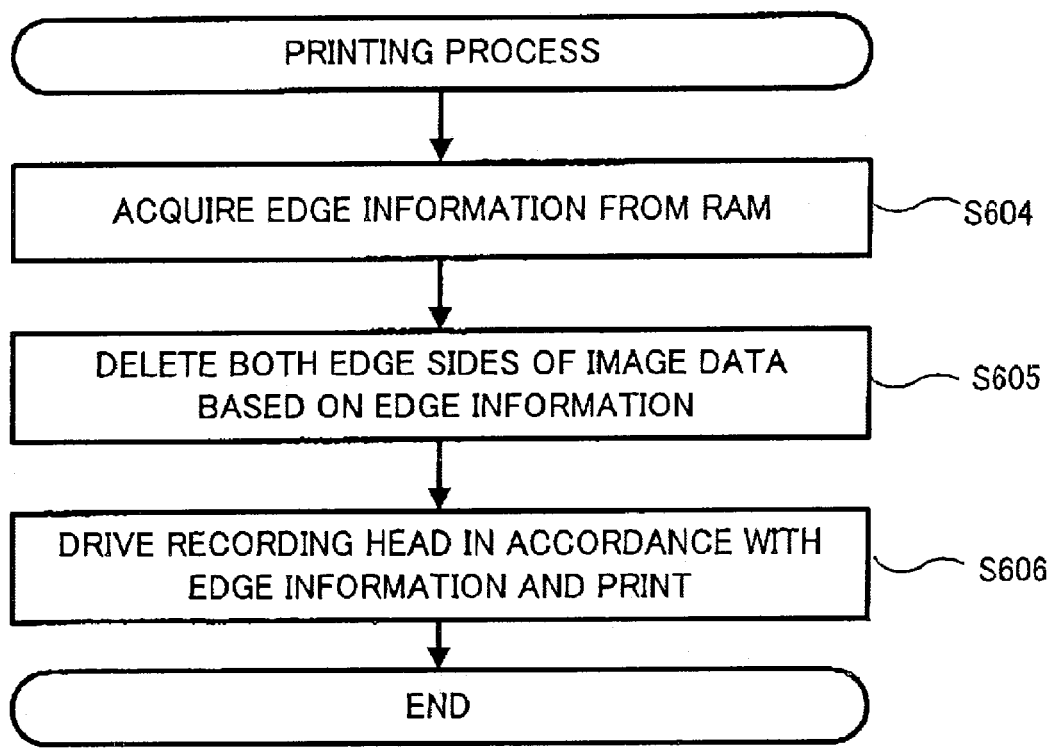
FIG. 23 is a flow chart showing a printing process in the fifth embodiment.
Figure 24:
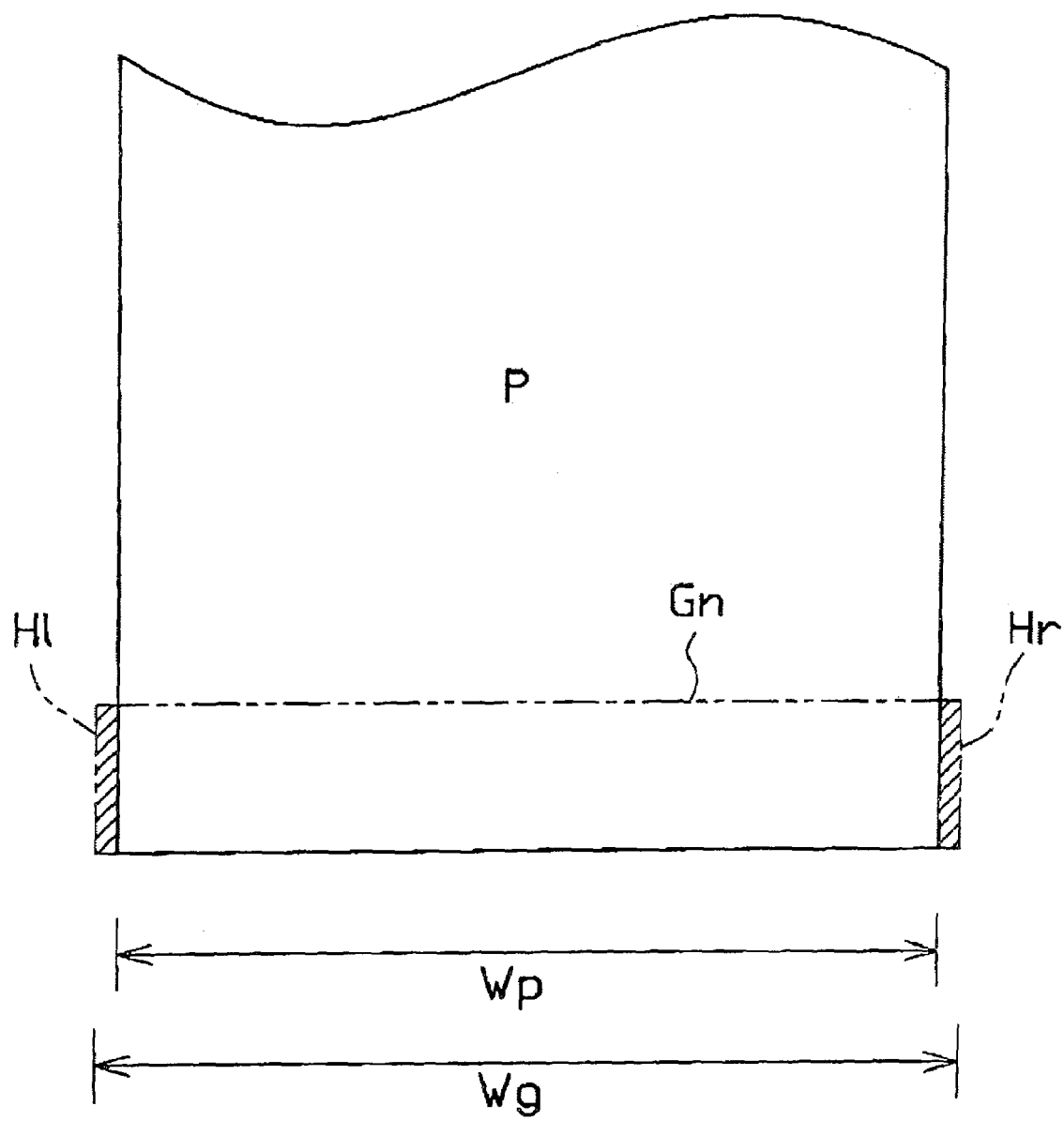
FIG. 24 is a schematic diagram showing regions Hl, Hr which are deleted from image data Gn.

Next, as shown in FIG. 10, the recording paper P is conveyed by an amount of linefeed width (S50). Then, ink is ejected from the recording head 39 while moving the scanning carriage 38 which stands by at the printing start position Q2 thus performing the printing on the recording paper P (S60). For example, as shown in FIG. 23, the edge information of the recording paper P which is stored in the RAM 67 is read (S604), and based on the left and right edge positions of the recording paper P contained in the edge information, the image data which drops out from the left and right edges is deleted (S605).

As shown in FIG. 247 the image data is outputted as an image data Gn for every band unit which corresponds to one linefeed width, and in the same manner as the first embodiment, the width Wg with respect to the recording image of the image data Gn is slightly wider than the paper width Wp of the recording paper P. Accordingly, out of the image data Gn, the regions H1, Hr which respectively drop out from the left and right edges of the recording paper P are deleted. In other words, the recording head 39 is controlled such that ink is not ejected from the recording head 39 with respect to the image data Gn on the portions corresponding to the regions H1, Hr, while the image recording is performed within a range between the left edge position and the right edge position of the recording paper P (S606). The regions H1, Hr which are respectively dropped out from the left and right edges of the recording paper P are deleted, and therefore, the recording head 39 does not eject ink in a state that the recording head 39 drops out from the left and right edges of the recording paper P and the image recording may be accurately performed in the periphery of the recording paper P.

Here, when there are no regions H1, Hr which are dropped out from the left and right edges of the recording paper P among the image data Gn attributed to an irregular conveying position of the recording paper P or the like, as a matter of course, the deletion of the image data Gn may not be performed. Further, when the irregular conveying position is present in the recording paper P, the center position may be calculated based on the left and right edge positions of the recording paper P and the centering which allows the center position of the recording paper P and the center position of the image data Gn to be aligned with each other may be preliminarily performed.

Then, when the image recording of an amount of one linefeed width of the image data Gn is completed, the controller 64 determines whether or not the recording paper P is conveyed by only a predetermined conveying (LF) amount, and as shown in FIG. 17, with respect to the recording paper P, the paper edge detecting processing is performed at positions P1, P2, P3, . . . which are spaced apart from each other at a predetermined interval in the conveying direction, and after performing the paper edge detection at the respective positions, the printing using the recording head 39 is performed based on the edge information acquired at these positions.

In this manner, according to the medium position determining device which is realized by this combined machine 1, the scanning carriage 38 is moved at the first speed which is a low speed in the vicinity of one edge of the recording paper P and one edge of the recording paper P is accurately detected, and after the one edge is detected, the scanning carriage 38 is moved at the second speed which is a high speed, and in the vicinity of another edge of the recording paper P, the scanning carriage 38 is moved again at the first speed which is a low speed, and another edge of the recording paper P may be accurately detected. Moreover, the moving time of the scanning carriage 38 may be reduced and it is possible to perform the edge detection of the recording paper P accurately and rapidly. Further, the combined machine 1 may, based on the acquired edge position, accurately record the image data on the recording paper P. Particularly, at the time of performing the marginless printing on the recording paper P, it is possible to perform the image recording on the periphery of the edge of the recording paper P with accuracy.

Hereinafter, a sixth embodiment is explained. In the fifth embodiment, the range M7 in which the scanning carriage 38 is moved at the first speed again on the right edge side of the recording paper P is calculated based on the detected left edge position and the size of the recording paper P which is indicated by the recording paper information which is contained in the printing data outputted from the computer. In this embodiment, the range in which the recording paper P is conveyed in a state that the approximate center in the width direction passes above the reference line L along the conveying direction and the scanning carriage 38 is moved at the first speed again on the right edge side of the recording paper P is calculated based on the detected left edge position and the reference line L. The fifth embodiment is substantially the same as the fifth embodiment except for the calculation method of the range in which the scanning carriage 38 is moved at the first speed. Therefore, only the differences between the sixth embodiment and the fifth embodiment are discussed with respect to the sixth embodiment.

Figure 25:
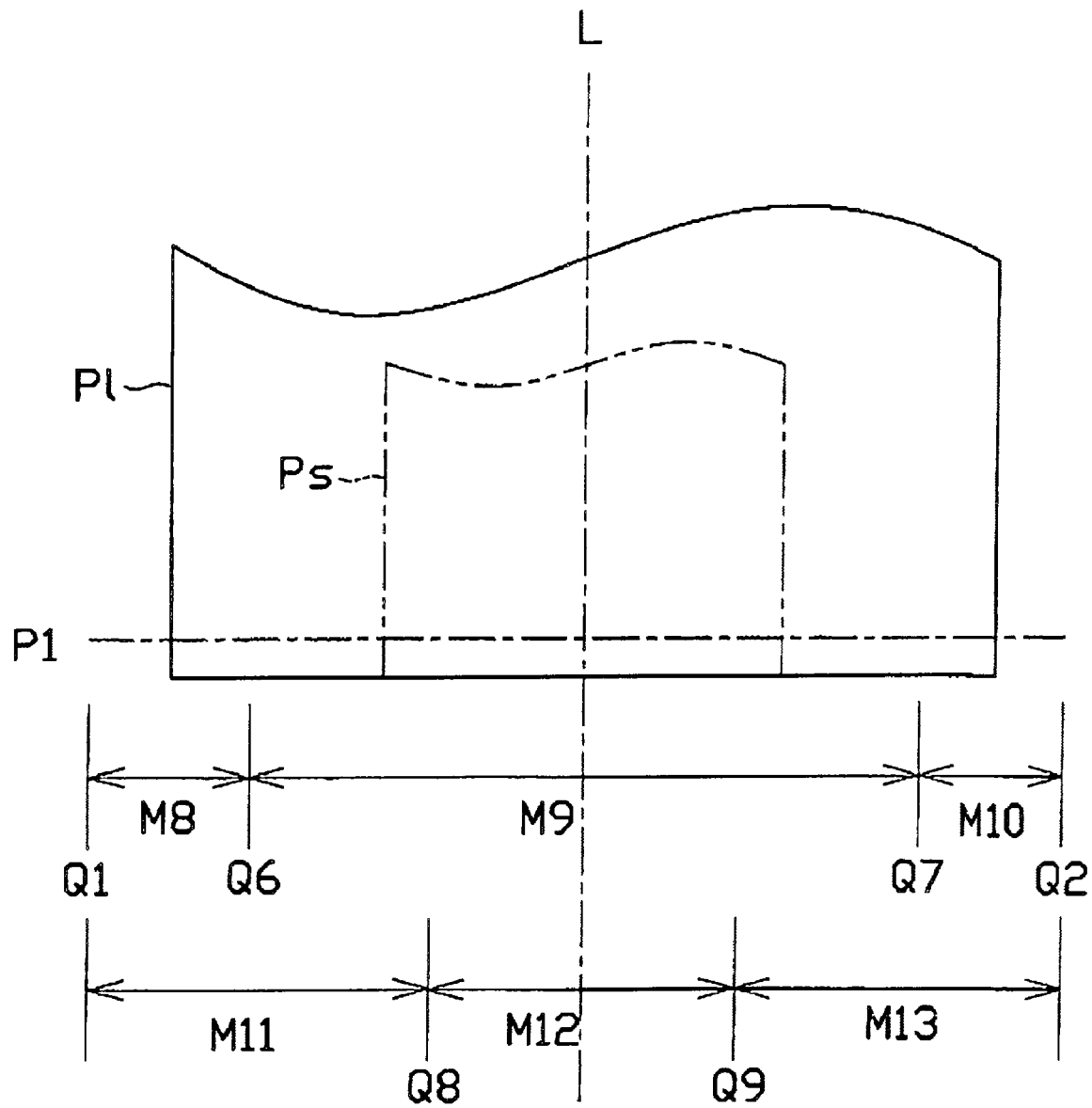
FIG. 25 is a schematic diagram showing a range in which the scanning carriage is moved at a first speed or a second speed according to a sixth embodiment.

In the sixth embodiment, as shown in FIG. 25, a recording paper P1 having a large size and a recording paper Ps having a small size are conveyed, such that the centers thereof in the width direction are positioned above the reference line L at the center of the conveying passage 23, that is, both recording papers P1, Ps are conveyed in the so-called center registration, wherein the center positions of recording papers P of all sizes are arranged on the reference line L Accordingly, as shown in FIG. 25, when the paper edge detection is performed at a front end position P1 of the recording paper P1, assuming that the controller 64 detects the left edge of the recording paper P1 when the scanning carriage 38 arrives at the position Q6, in a range M8 from the paper edge detecting start position Q1 to the position Q6, the scanning carriage 38 is moved at the first speed which is a low speed.

Then, when the scanning carriage 38 is moved toward the printing start position Q2 from the position Q6, the media sensor 50 is deactivated and the scanning carriage 38 is moved at the second speed which is a high speed. When the scanning carriage 38 arrives at the position Q7, the media sensor 50 is again activated and the scanning carriage 38 is moved at the first speed which is a low speed. This position Q7 is calculated based on the left edge position of the recording paper P1 which is already detected and the reference line L. That is, it is estimated that the right edge position of the recording paper P1 is a position which is symmetrical with respect to the left edge position of the recording paper P1 using the reference line L as a symmetrical axis. Then, the position Q7 may be set on the center side than the estimated right edge position of the paper.

Then, in the range M10 from the position Q7 to the printing start position Q2, the scanning carriage 38 is moved at the first speed which is a low speed thus acquiring the AD value by the media sensor 50, and the edge detection is performed in real time by the controller 64. Then, the controller 64, when the right edge of the recording paper P is detected, allows the RAM 67 to store the right edge position as the edge information.

Also with respect to the recording paper Ps having the small size, assuming that the controller 64 detects the left edge of the, recording paper Ps when the scanning carriage 38 arrives at the position Q8, in a range M11 from the paper edge detecting start position Q1 to the position Q8, the scanning carriage 38 is moved at the first speed which is a low speed.

Then, when the scanning carriage 38 is moved toward the printing start position Q2 from the position Q8, the media sensor 50 is deactivated and the scanning carriage 38 is moved at the second speed which is a high speed. When the scanning carriage 38 arrives at the position Q9, the media sensor 50 is again activated and the scanning carriage 38 is moved at the first speed which is a low speed. With respect to the position Q9, based on the left edge position of the recording paper Ps which is already detected and the reference line L, a position which assumes a left-and-right symmetry with the left edge position of the recording paper Ps with respect to the reference line L which constitutes an axis of symmetry is estimated as a right edge position, and the position Q9 is set at a side closer to the center of the paper than the estimated right edge position. In a range M13 from the position Q9 to the printing start position Q2, the scanning carriage 38 is moved at the first speed which is a low speed and thus acquiring the AD value by the media sensor 50, and the edge detection is performed by the controller 64 in real time.

Accordingly, this embodiment may have advantages that are similar to the advantages of the fifth embodiment. Further, the right edge position of the recording paper P may be estimated independent of the printing data outputted form the computer, and therefore, even when the size of the recording paper P which is inputted by a printer driver preinstalled in the computer differs from the size of the recording paper P fed to the combined machine 1, for example, it is possible to estimate the right edge position of the recording paper P which is actually fed thus detecting the right edge. Here, in this embodiment, in the ranges M10, M13 from the positions Q7, Q9 to the printing start position Q2, the scanning carriage 38 is moved at the first speed. However, after the night edge of the recording paper P is detected, the scanning carriage 38 may be moved at the second speed to the printing start position Q2.

Hereinafter, the seventh embodiment is explained. In the sixth embodiment, the recording paper P is conveyed in a state that the approximate center portion in the widthwise direction of the recording paper P passes over the reference line L along the conveying direction. In this embodiment, the recording paper P is conveyed in a state that the edge on a side opposite to the edge to be detected passes over the reference line L along the conveying direction. The seventh embodiment is substantially similar to the fifth embodiment except for the range in which the scanning carriage 38 is moved at the first speed. Therefore, only the differences between the seventh embodiment and the fifth embodiment are discussed with respect to the seventh embodiment.

Figure 26:
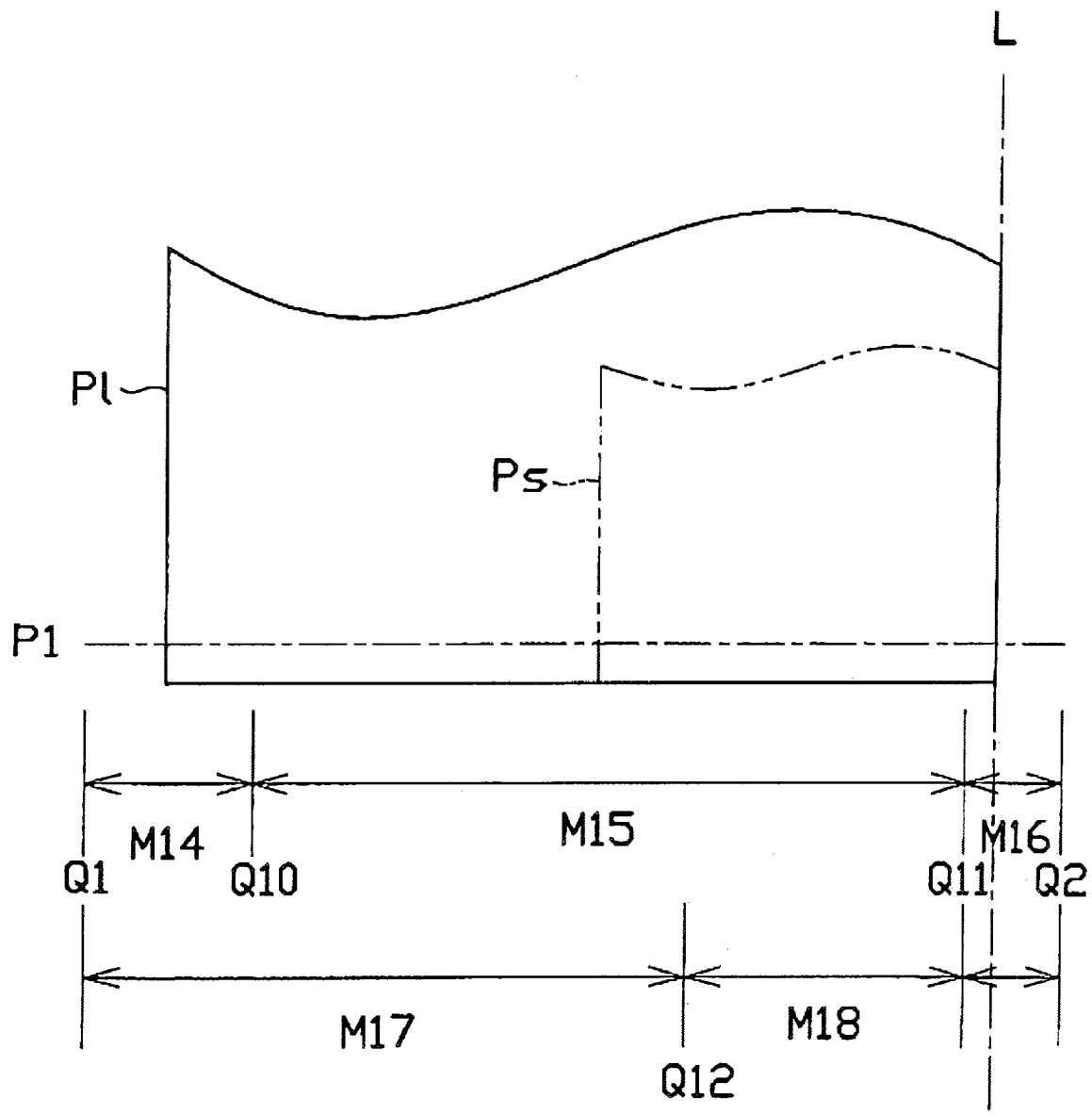
FIG. 26 is a schematic diagram showing a range in which the scanning carriage is moved at a first speed or at a second speed according to a seventh embodiment.

In the seventh embodiment, as shown in FIG. 26, a recording paper P1 having a large size and a recording paper Ps having a small size are conveyed, such that one-edge sides, that is, right edges in the drawing, are positioned above the reference line L at one-edge side of the conveying passage 23, that is, both recording papers P1 and Ps are transported in the so-called side registration. Accordingly, assuming the recording paper having a minimum size on which image recording is performed using the combined machine 1 of this embodiment as the recording paper Ps, using the edge side opposite to the reference line L of the recording paper Ps as the paper edge detecting start position Q1, the scanning by the scanning carriage 38 is moved on the reference line L side. Assuming that the controller 64 detects the left edge of the recording paper P1 when the scanning carriage 38 arrives at the position Q10, in a range M14 from the paper edge detecting start position Q1 to the position Q10, the scanning carriage 38 is moved at the first speed which is a low speed.

Then, when the scanning carriage 38 is moved toward the reference line L side from the position Q10, the media sensor 50 is deactivated and the scanning carriage 38 is moved at the second speed which is a high speed. When the scanning carriage 38 arrives at the position Q11, the media sensor 50 is again activated and the scanning carriage 38 is moved at the first speed which is a low speed. Because another edge of the recording paper P1 is conveyed along the reference line L, the position Q11 may be set at the side slightly closer to the center side from the reference line L.

Then, in the range M16 from the position Q11 to the printing start position Q2, the scanning carriage 38 is moved at the first speed which is a low speed thus acquiring the AD value by the media sensor 50, and the edge detection is performed in real time by the controller 64. Then, the controller 64, when the right edge of the recording paper P1 is detected, allows the RAM 67 to store the right edge position as the edge information.

Also with respect to the recording paper Ps having the small size, assuming that the controller 64 detects the left edge of the recording paper Ps when the scanning carriage 38 arrives at the position Q12, in a range M17 from the paper edge detecting start position Q1 to the position Q12, the scanning carriage 38 is moved at the first speed which is a low speed.

Then, when the scanning carriage 38 is moved toward the reference line L side from the position Q12, the media sensor 50 is deactivated and the scanning carriage 38 is moved at the second speed which is a high speed. When the scanning carriage 38 arrives at the position Q11, the media sensor 50 is again activated and the scanning carriage 38 is moved at the first speed which is a low speed. Because another edge of the recording paper Ps is conveyed along the reference line L, the position Q11 may be set to the fixed position irrespective of the size of the recording paper P.

Then, in the range M16 from the position Q11 to the printing start position Q2, the scanning carriage 38 is moved at the first speed which is a low speed thus acquiring the AD value by the media sensor 50, and the edge detection is performed in real time by the controller 64. Then, the controller 64, when the right edge of the recording paper Ps is detected, allows the RAM 67 to store the right edge position as the edge information.

Accordingly, the advantages of the seventh embodiment may be substantially similar to the advantages of the fifth embodiment. Further, because the edge on the reference line L side of the recording paper P is in the vicinity of the reference line L, at the edge on the reference line L side, the range in which the scanning carriage 38 is moved at the first speed is fixed irrespective of the size of the recording paper P.

Hereinafter, the eighth embodiment is explained. In the fifth embodiment, as shown in FIG. 21, the scanning carriage 38 is moved at the first speed which is a low speed and the AD value is acquired by the media sensor 50, and the controller 64 performs the edge detection in real time with respect to the AD value. In this embodiment, the AD value which the media sensor 50 outputs is stored in the RAM 67 and, after the media sensor 50 finishes the outputting of the AD value, the controller 64 performs the edge detection of the recording paper P. Accordingly, the scanning carriage 38 is moved at the first speed which is the a speed in the vicinity of one edge of the recording paper P and, after the scanning carriage 38 arrives at a predetermined position of the recording paper P, the scanning carriage 38 is moved at the second speed which is a high speed. In the vicinity of another edge of the recording paper P, the scanning carriage 38 is moved at the first speed which is a low speed.

The image recording operation of this embodiment is substantially similar to the image recording operation of the fifth embodiment except for the paper edge detecting process. That is, as shown in the flow chart in FIG. 10, when the printing data is transmitted to the controller 64 from the computer or the small-sized memory card (S10), the controller 64, in the printer part 2 of the combined machine 1, starts the feeding of the recording paper P held on the paper feed tray 20 (S20) and, subsequently, performs the light quantity adjustment of the media sensor 50 in the vicinity of the front end of the recording paper P. Thereafter, the paper edge detecting process according to this embodiment is performed.

Figure 27:
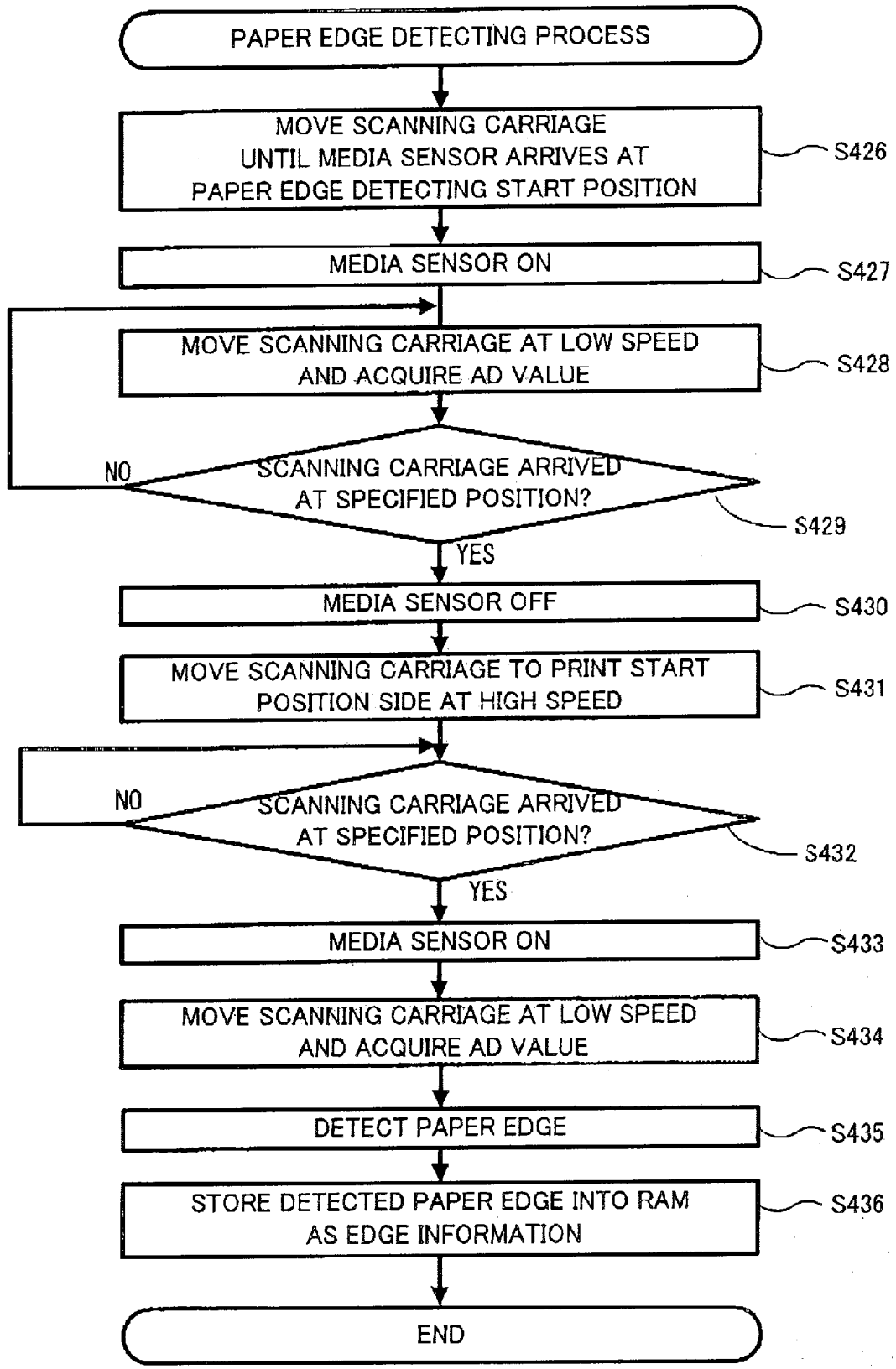
FIG. 27 is a flow chart showing a paper edge detecting process according to an eighth embodiment.

In the paper edge detecting processing, as shown in FIG. 27, the scanning carriage 38 is moved from the center position C (see FIG. 12) where the light quantity adjustment is performed to the paper edge detecting start position Q1 which is outside the range of the recording paper P (S426). Then, the media sensor 50 is deactivated (S427), and the scanning carriage 38 is moved to the side opposite to the paper edge detecting start position Q1, that is, to the right side in FIG. 28 at the first speed which is a low speed and the AD value is acquired (S428). The first speed is a speed which allows the media sensor 50 to detect the edge of the recording paper P with accuracy. Accordingly, the edge detection of the recording paper P becomes fine.

In this embodiment when the media sensor 50 performs the scanning and outputs the AD value, the controller 64 does not perform the edge detection. Accordingly, the AD value which the media sensor 50 outputs is sequentially stored in the RAM 67 in a correlating manner with the encoder amount of the linear encoder 77 which indicates the position of the scanning carriage 38. Then, the range in which the scanning carriage 38 is moved at the first speed which is a low speed or the second speed which is a high speed is set based on the size of the recording paper P which the recording paper information contained in the printing data outputted from the computer indicates.

Figure 28:
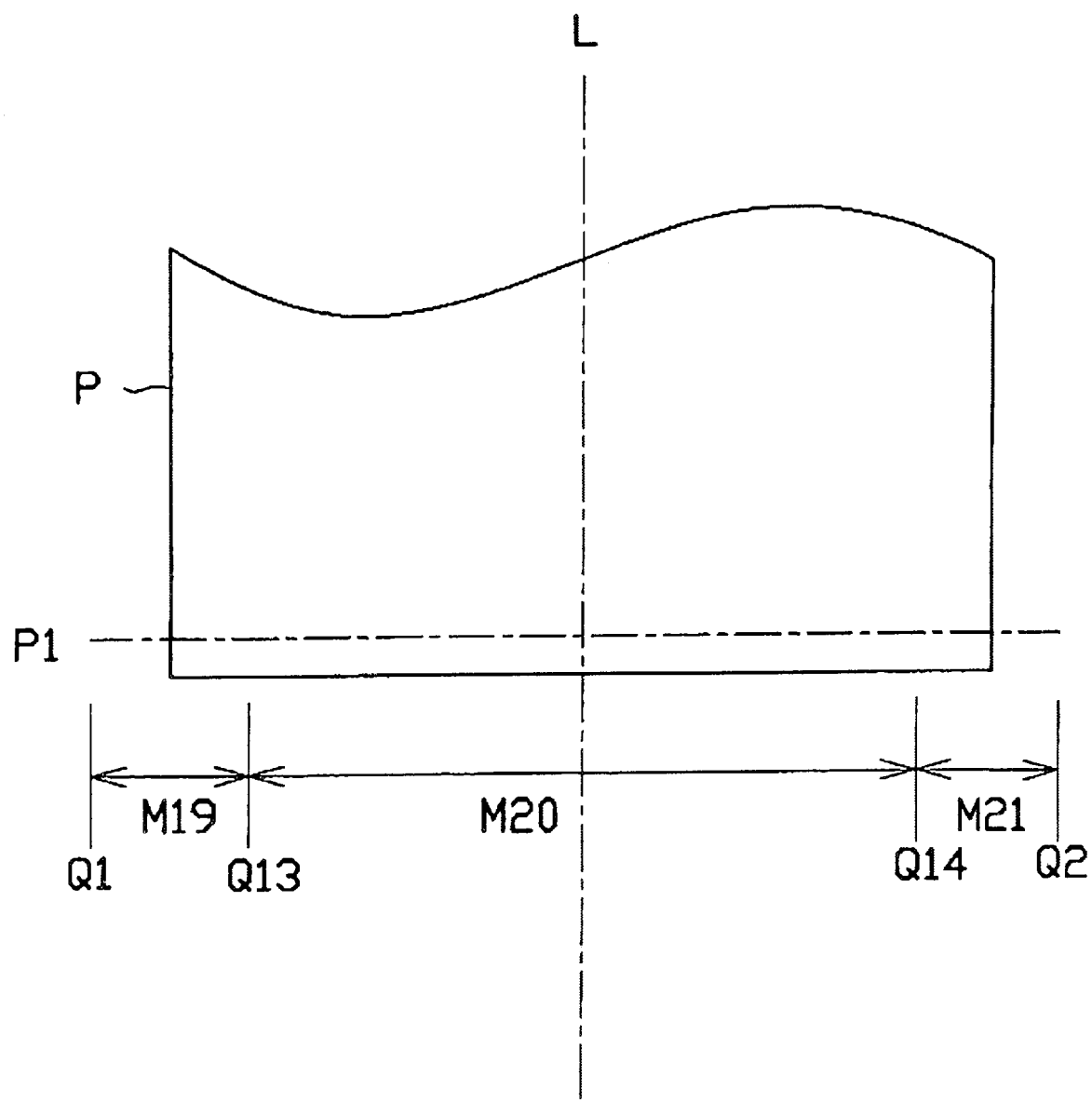
FIG. 28 is a schematic diagram showing a range in which the scanning carriage is moved at a first speed or at a second speed in the eighth embodiment.

For example, as shown in FIG. 28, assuming that the recording paper P is conveyed in the so-called center registration in which the approximate center in the widthwise direction of the recording paper P passes above the reference line L along the conveying direction, it is estimated that the positions which are respectively spaced apart from the reference line L in the scanning direction by ½ of the paper width obtained based on the size of the recording paper P are left and right edge positions of the recording paper P. Accordingly, in the predetermined range which includes the estimated left and right edge positions, the scanning carriage 38 is moved at the first speed which is a low speed, while in ranges other than the predetermined range, the scanning carriage 38 is moved at the second speed which is a high speed. Here, in this embodiment, although the explanation is made with respect to the case in which the recording paper P is conveyed in the center registration, when the recording paper P is conveyed in the side registration, the reference line L in the side registration and the position which is spaced apart in the scanning direction from the reference line L by the paper width may be estimated as the left and right edge positions of the recording paper P.

For example, as shown in FIG. 28, the scanning carriage 38 which is moved to the printing start position Q2 from the paper edge detecting start position Q1 at the first speed is moved at the first speed until the scanning carriage 38 gets over the left edge position of the recording paper P and reaches the position Q13 (S429), and the media sensor 50 acquires the AD value during this movement The acquired AD value is stored in the RAM 67 in a correlating manner with the encoder quantity of the linear encoder 77 which shows the position of the scanning carriage 38. When the scanning carriage 38 arrives at the position Q13, the media sensor 50 is turned off (S430). Accordingly, as shown in FIG. 28, when the paper edge detection is performed at the front end position P1 of the recording paper P, the scanning carriage 38 is moved at the first speed which is a low speed within the range M19 from the paper edge detecting start position Q1 to the position Q13.

Then, the scanning carriage 38 is moved to the printing start position Q2 from the position Q13 at the second speed which is a high speed (S431). The second speed is a speed that is greater than the first speed. During such movement, the media sensor 50 is not active, and therefore, the AD value is not outputted, and at the same time, the image recording which ejects ink from the recording head 39 also is not performed, and therefore, the scanning carriage 38 may be moved as fast as possible. Accordingly, compared to the case in which the media sensor 50 performs the scanning over the whole paper width of the recording paper P, the amount of time for edge detection may be reduced. Further, since the AD value is not outputted from the media sensor 50, it is unnecessary to store the AD value in the RAM 67. Accordingly, the storing region of the RAM 67 which temporarily stores the AD value may be reduced.

Then, when the scanning carriage 38 arrives at the position Q14 (S432), the media sensor 50 is again activated (S433), and the scanning carriage 38 is moved at the first speed which is a low speed (S434). The position Q14 is, in the same manner as the above-mentioned position Q13, set based on the size of the recording paper P which the recording paper information contained in the printing data outputted from the computer indicates.

Then, in a range M21 from the position Q14 to the printing start position Q2, the scanning carriage 38 is moved at the first speed which is a low speed and the media sensor 50 acquires the AD value (A434). The acquired AD value is stored in the RAM 67 in a correlating manner with the encoder amount of the linear encoder 77 which indicates the position of the scanning carriage 38.

Subsequently, the controller 64 detects the edge of the recording paper P based on the AD value which is stored in the RAM 67 (S435). The edge detecting method is substantially the same as the edge detecting method of the first embodiment, in which the left and right edge positions are determined based on the paper edge detection threshold value in view of the AD value indicated in FIG. 14. Then, the controller 64 allows the RAM 67 to store the detected left and right edge positions of the recording paper P as the edge information (S436).

The image recording operation after the finishing the paper edge detection is substantially the same as the corresponding operation of the fifth embodiment. That is, as shown in FIG. 10, the recording paper P is conveyed by an amount of line-feed width (S50), and ink is ejected from the recording head 39 while moving the scanning carriage 38 which stands by at the printing start position Q2 thus performing the printing on the recording paper P (S60). In the printing, the edge information of the recording paper P stored in the RAM 67 is read, and based on the left and right edge positions of the recording paper P contained in the edge information, the control is performed, such that the recording head 39 does not eject ink to the image data which drops out from the left and right edges. Further, the paper edge detecting processing is, as shown in FIG. 17, performed at positions P1, P2, P3, . . . which are spaced apart in the conveying direction with respect to the recording paper P. After performing the paper edge detection at the respective positions, the printing by the recording head 39 is performed based on the edge information obtained at the positions.

In this manner, according to the medium position determining device which is realized by this combined machine 1, the scanning carriage 38 is moved at the first speed which is the a speed in the vicinity of both edges of the recording paper P, and the scanning carriage 38 is moved at the second speed which is a high speed in other ranges and therefore, the moving time of the scanning carriage 38 may be reduced and, it is possible to perform the edge detection of the recording paper P accurately and rapidly. Further, the combined machine 1 may, based on the acquired edge position, accurately record the image data on the recording paper P. Particularly, at the time of performing the marginless printing on the recording paper P, it is possible to perform the image recording on the periphery of the edge of the recording paper P with accuracy.

The ninth embodiment is explained hereinafter. Similar to the eight embodiment, in the ninth embodiment, the AD value which the media sensor 50 outputs is stored in the RAM 67, and after the media sensor 50 finishes the outputting of the AD value, the controller 64 performs the edge detection of the recording paper P. However, in this embodiment, the range in which the scanning carriage 38 is moved at the first speed which is allow speed or the second speed which is a high speed is set independent of the printing data outputted from the computer.

In this embodiment, when the media sensor 50 performs the scanning and outputs the AD value, the controller 64 does not perform the edge detection. Accordingly, the AD value which the media sensor 50 outputs is sequentially stored in the RAM 67 in a correlating manner with the encoder amount of the linear encoder 77 which indicates the position of the scanning carriage 38. Then, the range in which the scanning carriage 38 is moved at the first speed which is a low speed or the second speed which is a high speed is set based on the size of the recording paper Ps having the minimum width on which the image recording is performed by the combined machine 1.

Figure 29:
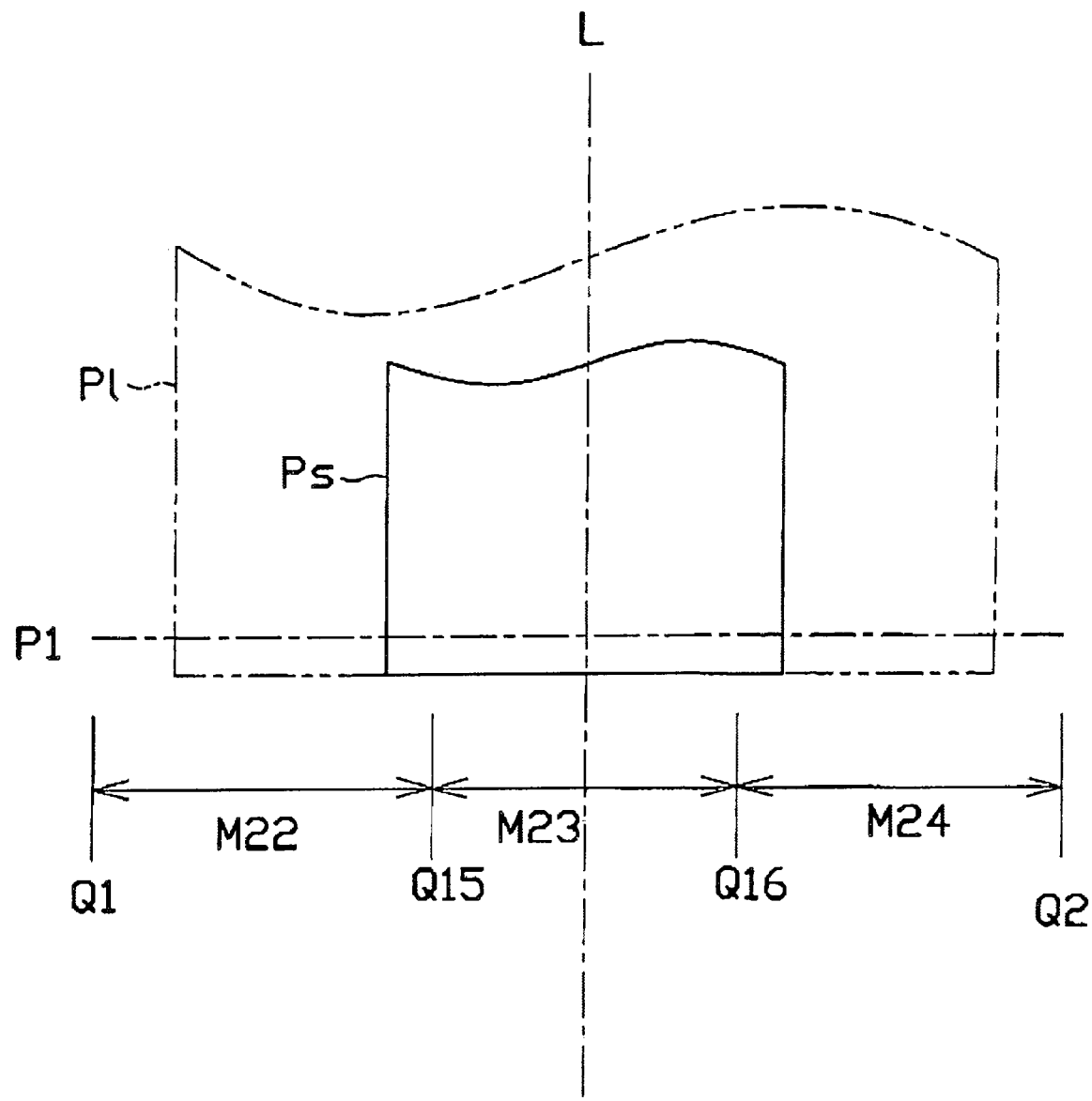
FIG. 29 is a schematic diagram showing a range in which the scanning carriage is moved at a first speed or at a second speed according to a ninth embodiment.
Figure 30:
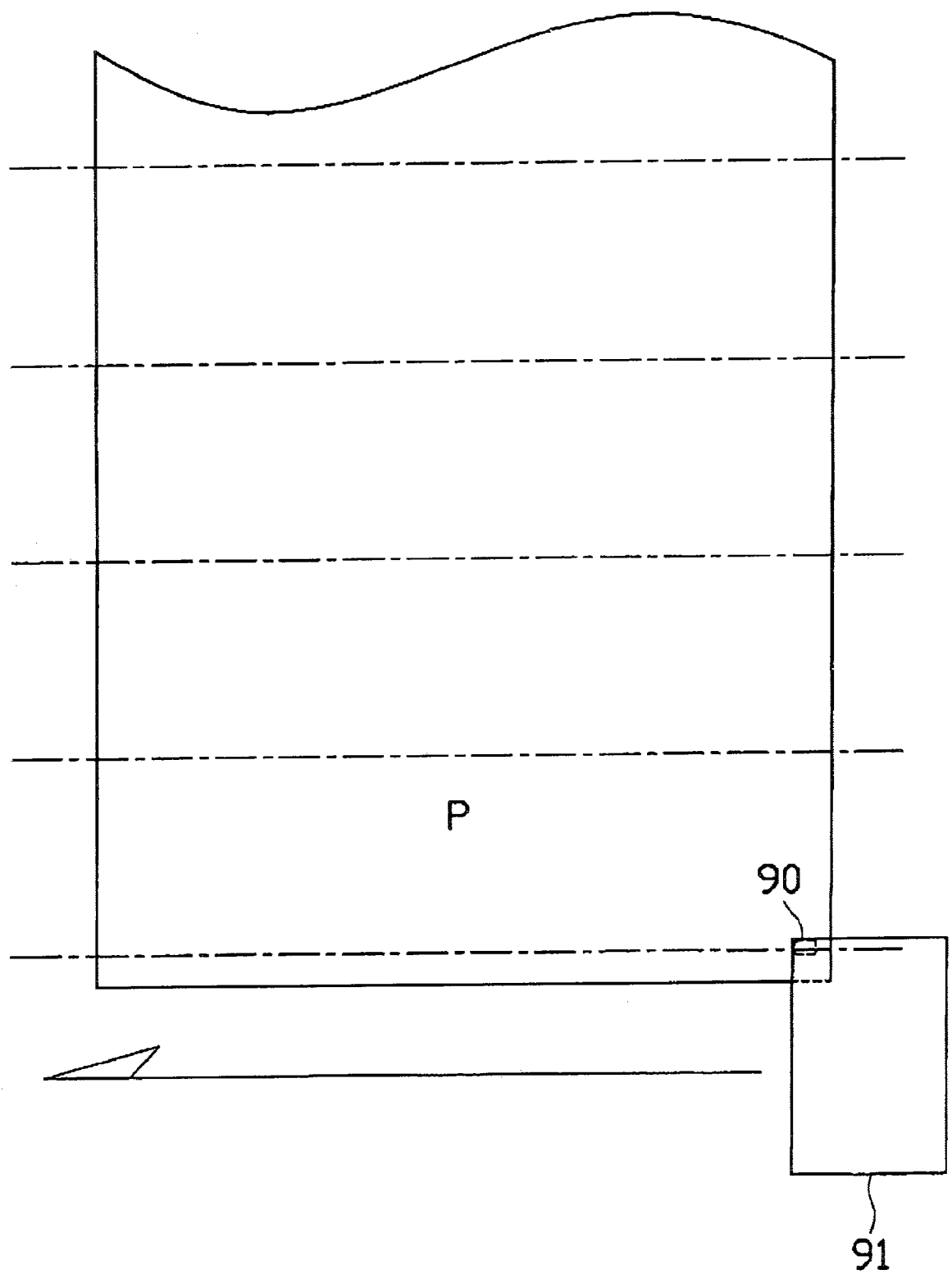
FIG. 30 is a schematic diagram showing a known paper edge detecting position.

For example, as shown in FIG. 29, assuming that the recording paper P is conveyed in the so-called center registration in which the approximate center in the widthwise direction of the recording paper P passes above the reference line L along the conveying direction, the positions which are respectively spaced apart from the reference line L in the scanning direction by ½ of the paper width of the recording paper Ps having the minimum width become left and right edge positions of the recording paper Ps. In the center side from these left and right edge positions, the scanning carriage 38 is moved at the second speed which is a high speed, while in other ranges, the scanning carriage 38 is moved at the first speed which is a low speed. Accordingly, the left and right edge positions of the recording paper P1 having the size larger than the size of the recording paper Ps having the minimum width always fall within the range in which the scanning carriage 38 is moved at the first speed, and therefore, it is possible to detect the left and right edges of the recording papers P having various sizes equal to or above the minimum width. Here, in this embodiment, the explanation has been made with respect to the case in which the recording paper P is conveyed in the center registration, when the recording paper P is conveyed in the side registration, the scanning carriage 38 may be moved at the second speed between the reference line L of the side registration and the position which is spaced apart from the reference line L in the scanning direction by the paper width of the recording paper Ps having the minimum width.

For example, as shown in FIG. 29, the scanning carriage 38 which is moved to the printing start position Q2 from the paper edge detecting start position Q1 at the first speed is moved at the first speed until the scanning carriage 38 gets over the left edge position of the recording paper Ps and reaches the position Q15, and the media sensor 50 acquires the AD value during this movement The acquired AD value is stored in the RAM 67 in a correlating manner with the encoder quantity of the linear encoder 77 which shows the position of the scanning carriage 38. Accordingly, the scanning carriage 38 is moved at the first speed within a range M22 from the paper edge detecting start position Q1 to the position Q15.

Then, in a range M23 from the position Q15 to a position Q16, the media sensor 50 is deactivated and the scanning carriage 38 is moved at the second speed. When the scanning carriage 38 arrives at the position Q16, the media sensor 50 is activated again and the scanning carriage 38 is moved at the first speed. That is, the within a range M24 from the position Q16 to the printing start position Q2, the scanning carriage 38 is moved at the first speed and the media sensor 50 acquires the AD value and the acquired AD value is stored in the RAM 67 in a correlating manner with the encoder quantity of the linear encoder 77 which indicates the position of the scanning carriage 38. Thereafter, the controller 64 detects the edge of the recording paper P based on the AD value stored in the RAM 67.

Accordingly, the advantages of the ninth embodiment may be substantially similar to the advantages of the eighth embodiment. Further, because the range in which the scanning carriage 38 is moved at the first speed or the second speed may be set independent of the printing data outputted from the computer, for example, even when the size of the recording paper P which is inputted in the printer driver preinstalled in the computer and the size of the recording paper P fed to the combined machine 1 differ from each other, it is possible to detect the left and right edge positions of the recording paper P which is actually fed. Further, the range in which the scanning carriage 38 is moved at the first speed or the second speed may be fixed irrespective of the size of the recording paper P, and the scanning carriage 38 may be readily controlled.

While the invention has been described in connection with preferred embodiments, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the flowing claims.

What is claimed is:

1. A medium position determining device, comprising:
   a sensor that is configured to detect at least a first side edge of the recording medium;
   a scanning carriage that is configured to move in a reciprocating manner in a scanning direction, wherein the sensor is mounted to the scanning carriage; and
   a controller that is configured to move the scanning carriage and to determine a position of the scanning carriage with respect to the recording medium when the scanning carriage moves in the scanning direction, wherein when the sensor detects at least the first side edge of the recording medium, the controller is configured, when the scanning carriage performs scanning for determining the medium position, to:
   move the scanning carriage from a particular position outside the recording medium to a first position within the recording medium via a further position corresponding to the first side edge of the recording medium at a first speed in the scanning direction;
   determine that the scanning carriage is in first position; and
   move the scanning carriage in the scanning direction at a second speed that is greater than the first speed after the controller determines that the scanning carriage is in the first position.

2. The medium position determining device according to claim 1, wherein the first position is the first side edge of the recording medium.

3. The medium position detecting device according to claim 1, wherein the controller estimates a location of the first position based at least on an inputted medium information comprising width information associated with the recording medium.

4. The medium position determining device according to claim 3, wherein the first position corresponds to a position estimated to be a center of the recording medium in the scanning direction.

5. The medium position determining device according to claim 1, wherein the recording medium is conveyed to a detecting position of the sensor by a conveying mechanism in a state that the approximate center in the scanning direction of the recording medium passes a reference line along the conveying direction orthogonal to the scanning direction of the scanning carriage, and the controller moves the scanning carriage to the first position on the reference line at the first speed.

6. The medium position determining device according to claim 1, wherein the recording medium is conveyed to a detecting position of the sensor by a conveying mechanism in a state that a second side edge of the recording medium opposite the first side edge of the recording medium passes a reference line along the conveying direction orthogonal to the scanning direction of the scanning carriage, and the controller moves the scanning carriage to the first position from the scanning end side opposite to the reference line at the first speed.

7. The medium position determining device according to claim 6, wherein the first position is estimated based on a position of reference line and a minimum width that the conveying mechanism is configured to convey.

8. The medium position determining device according to claim 1, wherein after the controller determines that the scanning carriage is in a second position within the recording medium, the controller transitions the speed of the scanning carriage from the second speed to the first speed.

9. The medium position determining device according to claim 8, wherein after the controller determines that the scanning carriage is in a predetermined position outside the recording medium, the controller transitions the speed of the scanning carriage from the first speed to the second speed.

10. The medium position determining device according to claim 9, wherein the first position, the second position, and the predetermined position are estimated based at least on an inputted width information associated with the recording medium.

11. The medium position determining device according to claim 9, wherein the second position and the predetermined position are estimated based at least on a detected position of the first side edge.

12. The medium position determining device according to claim 11, wherein the recording medium is conveyed to a detecting position of the sensor by a conveying mechanism in a state that the approximate center in the scanning direction of the recording medium passes a reference line along the conveying direction orthogonal to the scanning direction of the scanning carriage, and the controller, by regarding a position which is symmetrical with respect to the reference line based on the detected position of the first side edge as a position of the second side edge, estimates the second position and the predetermined position.

13. The medium position determining device according to claim 11, wherein the recording medium is conveyed to a detecting position of the sensor by a conveying mechanism in a state that the second side edge of the recording medium passes a reference line along the conveying direction orthogonal to the scanning direction of the scanning carriage, and the second position is estimated in the vicinity of the reference line.

14. An image recording device comprising:
   a conveying mechanism which conveys a recording medium in a conveying direction;
   a sensor that is configured to detect at least a first side edge of the recording medium;
   a scanning carriage that is configured to move in a reciprocating manner in the scanning direction, wherein the sensor is mounted to the scanning carriage;
   a first controller that is configured to move the scanning carriage and to determine a position of the scanning carriage with respect to the recording medium when the scanning carriage moves in the scanning direction;
   a storing unit that is configured to store side edge information which indicates a side edge position of the recording medium; and
   a second controller that is configured to control an image recording operation of the recording head based on the side edge information stored in the storing unit;
   wherein, when the sensor detects at least the first side edge of the recording medium the first controller is configured, when the scanning carriage performs scanning for determining the medium position, to:
      move the scanning carriage from a particular position outside the recording medium to a first position within the recording medium via a further position corresponding to the first side edge of the recording medium at a first speed in the scanning direction;
      determine that the scanning carriage is in the first position; and
      move the scanning carriage in the scanning direction at a second speed that is greater than the first speed after the first controller determines that the scanning carriage is in the first position.

15. The image recording device according to claim 14, wherein the second controller controls an image recording operation of the recording head such that the recording head performs image recording from the first side edge of the recording medium by deleting image data which drops out from the first side edge of the recording medium, and performs image recording by allowing image data which drops out from the second side edge of the recording medium to drop out from the second side edge of the recording medium.

16. The image recording device according to claim 15, wherein the second controller controls an image recording operation of the recording head by performing image recording within a range of side edges of the recording medium.

17. The image recording device according to claim 14, wherein the sensor is mounted on the scanning carriage with the recording head.

18. The image recording device according to claim 17, wherein the sensor is arranged upstream in the conveying direction of the recording head in the scanning carriage, and the sensor detects the side edge at a distal end of the recording medium.

19. The image recording device according to claim 18, wherein the sensor detects the side edge at a predetermined interval in the conveying direction from the distal end of the recording medium.

20. A method for recording an image using a medium position determining device, wherein the device comprises a sensor, a scanning carriage that is configured to move in a reciprocating manner in a scanning direction, and a controller that is configured to move the scanning carriage and to determine a position of the scanning carriage with respect to a recording medium, wherein the method comprises, when the scanning carriage performs scanning for determining the medium position, the steps of:
   (a) moving the scanning carriage from a particular position outside the recording medium to a first position within the recording medium via a further position corresponding to the first side edge of the recording medium at a first speed in the scanning direction;
   (b) detecting at least the first side edge of the recording medium during a performance of step (a):
   (c) determining that the carriage is in the first position; and
   (d) after a performance of step (c), moving the scanning carriage in the scanning direction at a second speed that is greater than the first speed.

* * * * *